US005590317A

United States Patent [19]

Iguchi et al.

[11] Patent Number: 5,590,317

[45] Date of Patent: Dec. 31, 1996

[54] DOCUMENT INFORMATION COMPRESSION AND RETRIEVAL SYSTEM AND DOCUMENT INFORMATION REGISTRATION AND RETRIEVAL METHOD

[75] Inventors: Hiroaki Iguchi, Yokohama; Yasuo Kurosu, Yokosuka; Masaaki Fujinawa, Kanagawa-ken; Yoshihiro Yokoyama, Yokohama; Hidefumi Masuzaki, Hadano, all of Japan

[73] Assignee: Hitachi, Ltd., Tokyo, Japan

[21] Appl. No.: 68,658

[22] Filed: May 27, 1993

[30] Foreign Application Priority Data

May 27, 1992 [JP] Japan .................................... 4-135340
May 27, 1992 [JP] Japan .................................... 4-135341

[51] Int. Cl.[6] .................................................... G06F 17/30

[52] U.S. Cl. .................................... 395/602; 364/DIG. 1; 364/282.1

[58] Field of Search ....................... 395/600; 364/419.13, 364/419.14

[56] References Cited

U.S. PATENT DOCUMENTS

| | | | |
|---|---|---|---|
| 3,593,309 | 7/1971 | Clark, IV et al. | 395/600 |
| 3,613,086 | 10/1971 | Lozides et al. | 364/419.19 |
| 4,672,679 | 6/1987 | Freeman | 382/40 |
| 4,796,003 | 1/1989 | Bentley et al. | 341/95 |
| 4,843,389 | 6/1989 | Lisle et al. | 341/106 |
| 4,876,541 | 10/1989 | Storer | 341/51 |
| 4,899,148 | 2/1990 | Sato et al. | 341/65 |
| 5,155,484 | 10/1992 | Chambers, IV | 341/55 |
| 5,168,533 | 12/1992 | Kato et al. | 382/54 |
| 5,229,947 | 7/1993 | Ross et al. | 364/443 |
| 5,239,298 | 8/1993 | Wei | 341/51 |
| 5,265,242 | 11/1993 | Fujisawa et al. | 395/600 |
| 5,281,967 | 1/1994 | Jung | 341/55 |
| 5,298,895 | 3/1994 | Van Mareu | 341/51 |
| 5,319,779 | 6/1994 | Chang et al. | 395/600 |
| 5,321,770 | 6/1994 | Huttenlocher et al. | 382/22 |
| 5,337,233 | 8/1994 | Hofert et al. | 364/419.14 |
| 5,491,760 | 2/1996 | Withgott et al. | 382/203 |
| 5,519,857 | 5/1996 | Kato et al. | 395/600 |

FOREIGN PATENT DOCUMENTS

| | | |
|---|---|---|
| 62-140136 | 6/1987 | Japan . |
| 3-174652 | 7/1991 | Japan . |
| 3-209922 | 9/1991 | Japan . |
| 3-209923 | 9/1991 | Japan . |
| 3-206533 | 9/1991 | Japan . |

OTHER PUBLICATIONS

Stern, "Compression Techniques for Mobile Data Terminal Communication", Proc 41st IEEE Vehicular Technology Conference, 19–22 May 1991, pp. 429–432.

Graefe et al, "Data Compression and Database Performance", Proc Applied Computing Symposium, 1991, pp. 22–27.

*Primary Examiner*—Wayne Amsbury
*Attorney, Agent, or Firm*—Antonelli, Terry, Stout & Kraus

[57] ABSTRACT

A document information compression and retrieval system which reduces the document data amount and shortens the retrieval time when mass document information is registered and retrieved. A method of registering document information in a document information retrieval system which stores document information consisting of a large number of characters for retrieval of the stored document information. Entered document information is separated into words. Whether or not each of the words is a word to which a compressed code is assigned is determined. If not already assigned, a compressed code is assigned to the word. The words are converted into the assigned compressed codes for storing a compressed text. At output, retrieval information is accepted and converted into compressed code and stored compressed texts are searched for the compressed text matching the compressed code of the retrieval information, then the words corresponding to the compressed codes are used to expand the compressed text into original document information.

16 Claims, 16 Drawing Sheets

FIG. 5

| CHARACTER DATA STRING | NO. OF OCCURRENCES | COMPRESSION CONTRIBUTION DEGREE | |
|---|---|---|---|
| | | (A) | (B) |
| 文書 | 3 | 6 | 4 |
| 情報 | 5 | 10 | 8 |
| テキスト | 1 | 4 | 0 |
| データ | 3 | 9 | 6 |
| インフォメーション | 1 | 9 | 0 |
| 圧縮 | 4 | 8 | 6 |

⇒ CODE CONVERSION DICTIONARY MATCHING (b) ... す な わ ち 文 書 情 報 検 索 装 置 の ブ ロ ッ ク 図 は ...
01AB　2153　238D　A591　DE35　82CC　A591　0A3B　907D　82CD

⇒ CHARACTER CODE CONVERSION (c) ... (01)(21)(23)(A5)(DE)(82)(0A)(90)(82)
(AB)(53)(8D)(91)(35)(CC)(3B)(7D)(CD) ...

⇒ STORE IN TEXT DATA FILE

FILING

| CHARACTER STRING | COMPRESSED CODE | ID NO. |
|---|---|---|
| コンピューター | 30A2 | 0000 |
| コンピュータ | | 0001 |
| コンピュウタア | | 0002 |
| コンピュウター | | 0003 |
| 計算機 | | 0004 |
| 電子演算機 | | 0005 |

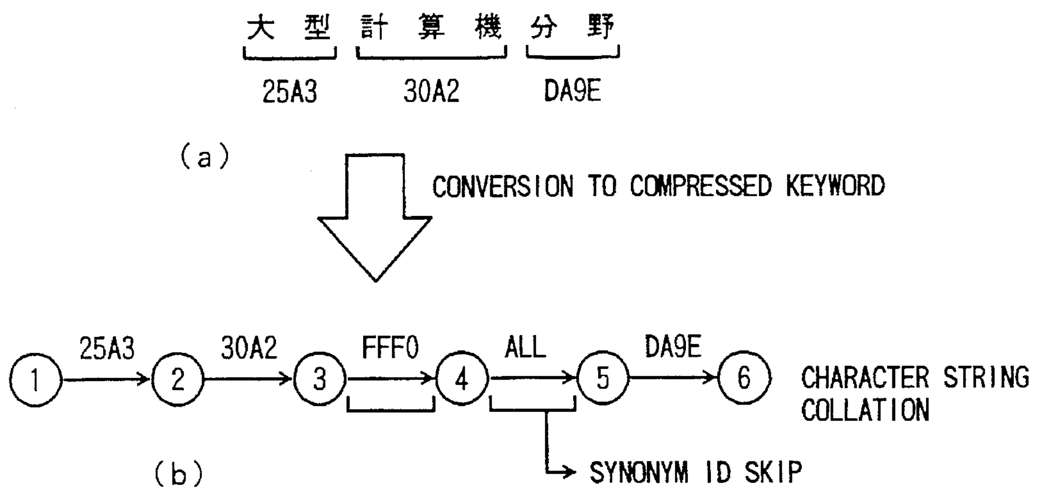

⬇ CONVERSION TO COMPRESSED KEYWORD

①→25A3→②→30A2→③→FFF0→④→ALL→⑤→DA9E→⑥ CHARACTER STRING COLLATION

↳ SYNONYM ID SKIP (b)

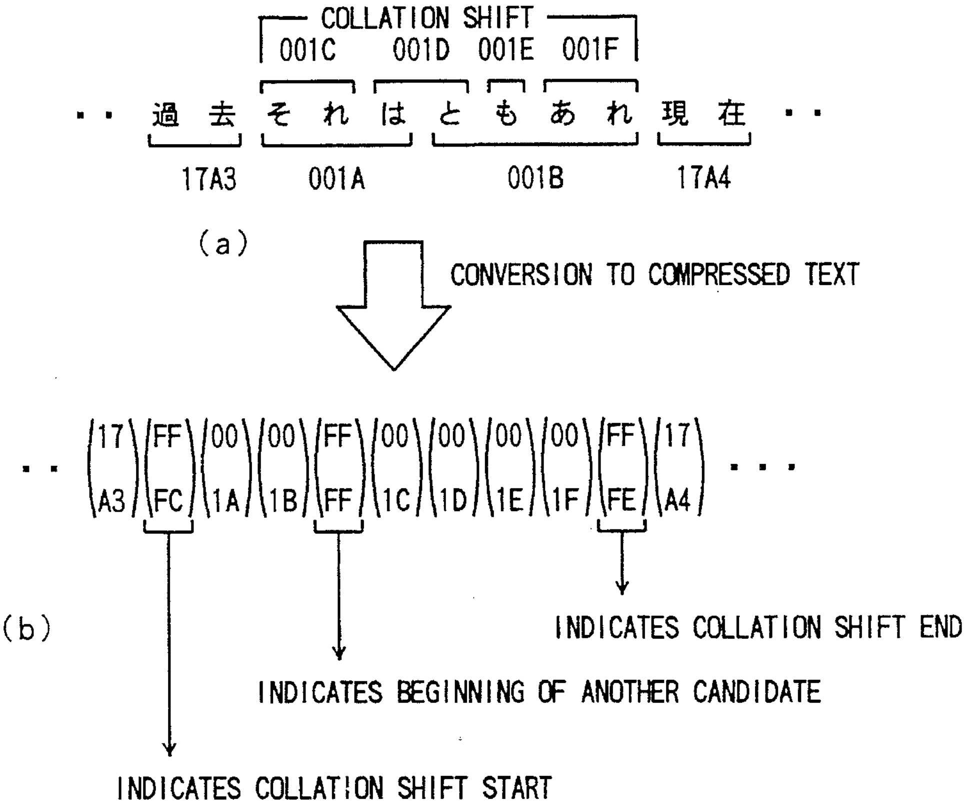

FIG. 16

```
       ┌──── COLLATION SHIFT ────┐
       │ 001C   001D   001E   001F │
··過去 それ は と も あれ 現在··
   17A3  001A       001B    17A4
```

(a)

⬇ CONVERSION TO COMPRESSED TEXT

..(17/A3)(FF/FC)(00/1A)(00/1B)(FF/FF)(00/1C)(00/1D)(00/1E)(00/1F)(FF/FE)(17/A4)...

(b)

↑ INDICATES COLLATION SHIFT END

↑ INDICATES BEGINNING OF ANOTHER CANDIDATE

↑ INDICATES COLLATION SHIFT START

DOCUMENT INFORMATION COMPRESSION AND RETRIEVAL SYSTEM AND DOCUMENT INFORMATION REGISTRATION AND RETRIEVAL METHOD

BACKGROUND OF THE INVENTION

1. Field of the Invention

This invention relates to an information registration, storage, and retrieval system and more particularly to a document information compression and retrieval system appropriate for application to text data such as Japanese and English document texts and program languages.

2. Description of Related Art

In recent years, data base services providing document information, patent information, etc., have spread and information processing fields in which text data is handled have become large-scaled and increasingly generalized. This tendency involves an explosive increase of document information handled with general-purpose small office automation devices as well as large-scaled computer systems. To consider registration of more document information in a limited storage capacity or consider high-speed registration, retrieval, and reading of documents stored on low-speed data media, registration of text data on storage media in compressed form provides effective means for information processing.

Hitherto, a method of assigning one code to one character has been used as a text data description method. However, in such a conventional technique, even if the same word (character data string) is input many times as Japanese and English document text data, program languages, etc., each of the same input words (character data strings) is divided into character codes making up the word (character data string) for registration on storage media. Therefore, the text data is redundant and requires a large storage capacity.

A conventional system for solving this problem is described in Japanese Patent Laid-Open No. 62-140136. If it is previously known that the same word (character data string) will be input many times, one compressed code is assigned to the word (character data string) for conversion, then stored on storage media, thereby reducing the necessary storage capacity.

According to this prior art described in Japanese Patent Laid-Open No. 62-140136, it is made possible to register document text data on storage media in compressed form and the capacity required to store the text data can be reduced efficiently. However, the prior art is effective only when the contents of a document to be input are previously known and only for text data containing the same predetermined words (character data strings) which are input many times. Therefore, if unknown text data is input, the system does not compress the text data unless a word (character data string) to which a compressed code happens to be assigned occurs. Further, if unknown text data newly input contains words (character data strings) occurring repeatedly, the system cannot provide effective compression.

For the information retrieval methods of data bases, those skilled in the art focus on a full text search system which enables direct reference to be made to a text of a document such as document information or patent information for retrieval instead of conventional retrieval systems using keywords and sort codes.

The full text search system, as the name implies, handles document texts themselves as retrieval information, and provides a technique which can eliminate thoroughly the bad effects of retrieval using an index, such as the enormous labor overhead involved in index registration and a retrieval error or oversight caused by different persons who register the index and retrieve a document, which always result from retrieval using an index such as keywords or sort codes.

However, the full text search system introduces some problems not related to the index retrieval systems. The greatest problem among them is the retrieval time. The full text search system retrieves document texts themselves, and thus is not practical for retrieval of data base service information, etc., handled so far. For example, if an attempt is made to make a full text search for 20000 documents each having a size of 20 KB, a search must be made for 400 MB of data. If the data is read at the execution speed of 1 MB/s on average and collated at the same speed, about seven minutes is required to complete the retrieval.

A conventional system for solving this problem is described in Japanese Patent Laid-Open No. 03-174652. Document text data is divided for registration on a plurality of magnetic disks and the text data is fetched in parallel from the magnetic disks for speeding up reading of the text data. Further, a table of characters occurring in the text is created and a data file, called a compressed text, is created in which function words such as conjunctions and postpositional particles (postpositional words functioning as auxiliaries to main words), and words occurring repeatedly are eliminated, and a presearch is made in two stages before a full text search, thereby enabling the retrieval speed for practical information retrieval.

According to this prior art, retrieval processing of an enormous quantity of document text data can be completed within a practical time, thereby providing a very useful technique for implementation of a full text search system.

However, the prior art described in Japanese Patent Laid-Open No. 03-174652 uses the 2-stage presearch technique intended for improvement of the text data retrieval speed; to make a presearch at retrieval, it is necessary to previously create a compressed text and a character component table from text data and save them together with the text data on document data save means, such as a magnetic disk. This causes a problem of increasing document data by the capacity of the compressed text and character component table in addition to the text data. Further, since the presearch technique is not fundamentally a text search, a text search is also necessary to produce the final retrieval result and in the worst case, when the document hunt cannot be narrowed down by the presearch, retrieval processing will be again performed for all texts. Thus, the necessary processing time becomes the sum of the retrieval processing time required for the presearch and the retrieval time for all texts. This means that the retrieval time increases instead of becoming shorter.

SUMMARY OF THE INVENTION

Accordingly, it is an object of the invention to provide a document information compression and retrieval system which can reduce a text data storage capacity and provide efficient compressed codes.

Another object of the invention is to provide a document information compression and retrieval system which provides a full text search system for improving the retrieval speed of text data.

To these ends, according to a first embodiment of the invention, there is provided a document information compression and retrieval system which aims at registration techniques for character string information (character data strings) to which compressed codes are assigned, the document information compression and retrieval system comprising an input section for inputting document information; a text analysis section which separates document information input at the input section into character string information; a code conversion dictionary in which pairs of the character string information and corresponding compressed codes are stored; a text compression section which makes reference to the code conversion dictionary for converting the character string information into the compressed codes corresponding thereto; compressed text storage means for storing the compressed codes of all character string information of the document information compressed by the text compression section as a compressed text; retrieval information input means for entering retrieval information used to retrieve document information registered in the compressed text storage means; a text retrieval section which retrieves compressed texts stored in the compressed text storage means in response to retrieval information entered through the retrieval information input means; an expansion section which expands the compressed text retrieved by the text retrieval section into document information; an output section for outputting the document information expanded by the expansion section; and character string registration means for detecting character string information not registered in the code conversion dictionary from the character string information into which the document information is separated by the text analysis section and assigning compressed codes to the character string information not registered in the dictionary in sequence for registering the character string information in the code conversion dictionary. The text compression section makes reference to the code conversion dictionary in which character string information is registered by the character string registration means for converting the character string information into the compressed codes corresponding thereto.

The document information compression and retrieval system further includes a word occurrence registration dictionary in which occurrence count information indicating the number of occurrences of character string information of the document information input at the input section is recorded; and a compressed word determination section which calculates the compression effect for each character string information by using the occurrence count information and the code length of the character string information, wherein the compressed word determination section determines character string information to provide an optimum compression effect for all character string information of the document information from the character string information compression effect and wherein the character string registration means can register the character string information from the compressed word determination section in the code conversion dictionary.

When a compressed code registration area of the code conversion dictionary is finite, the character string registration means assigns the compressed codes to character string information in sequence, and terminates assignment of the compressed codes upon detection of the compressed code registration area becoming full, and the text compression section, after the termination of assignment of the compressed codes, converts the character string information already registered in the code conversion dictionary into their corresponding compressed codes and stores character string information not registered in the dictionary in the compressed text storage means without conversion into compressed codes.

When the compressed code registration area of the code conversion dictionary is finite, the character string registration means may also assign the compressed codes to the character string information in sequence, and upon detection of the compressed code registration area becoming full, store the contents of the code conversion dictionary and the identification information to identify the dictionary, store the identification information to identify the dictionary together with the compressed texts in the compressed text storage means, and create a new code conversion dictionary for registering other character string information. Further, when the document information is output, the expansion section uses the same code conversion dictionary that is used for compressing texts for expanding the compressed texts. The contents of the code conversion dictionary and the identification information to identify the dictionary can be stored together with the compressed texts in the compressed text storage means.

A code conversion dictionary file which stores a plurality of code conversion dictionaries can be further included to store the contents of the code conversion dictionary and the identification information to identify the dictionary.

When the compressed code registration area of the code conversion dictionary is finite, the character string registration means can assign the compressed codes to the character string information in sequence, and detects the compressed code registration area becoming full, and when the compressed code registration area becomes full, the compressed word determination section can replace character string information having a low compression effect with character string information providing an optimum compression effect for assignment of compressed codes in response to the low compression effect. In this case, the character string registration means reads the compressed texts in the compressed text storage means, expands the compressed codes of the character string information having the low compression effect, and stores them in the compressed text storage means.

The document information compression and retrieval system further includes a character string table in which specific character string information is prestored, wherein the character string registration means may determine whether or not character string information not registered in the code conversion dictionary matches the character string information stored in the character string table for registering the matching character string information in the code conversion dictionary.

The text analysis section can use lexical analysis processing as a text analysis technique of separating the document information into character string information.

The document information compression and retrieval system further includes a text analysis dictionary in which character string information for separating input document information into character string information is prestored, wherein the text analysis section may perform character string matching with the text analysis dictionary as a text analysis technique of separating the document information into character string information. When multiple match occurs in the character string matching with the text analysis dictionary, the longest character string information registered in the text analysis dictionary can be adopted for separation.

The compressed word determination section may assign compressed codes to character string information providing a compression effect of a predetermined compression effect or higher from compression effects of character string information of document information.

Further, the code conversion dictionary can be stored in the compressed text storage means together with compressed text data.

The text compression section can convert retrieval information entered through the retrieval information input means into compressed key data and the text retrieval section can collate the compressed key data with the compressed texts for retrieving an appropriate compressed text.

A magnetic disk drive or an optical disk drive can be used for the compressed text storage means. The code conversion dictionary can be stored in a semiconductor memory or on a magnetic or optical disk.

According to a second embodiment of the invention, there is provided a document information compression and retrieval system which aims at compression techniques of text data, the document information compression and retrieval system comprising an input section for inputting document information; text storage means for storing the document information; retrieval information input means for entering key information and a retrieval condition used to retrieve document information registered in the text storage means; character string collation means for collating the key information with the registered document information and for outputting a collation result; retrieval expression conversion means for generating a retrieval condition expression from the retrieval condition; retrieval condition determination means for determining document information matching the retrieval condition expression; output means for outputting the result determined by the retrieval condition determination means; a text compression section which converts the document information input at the input section into a compressed text for compression; and an expansion section which expands the compressed text into original document information. The text storage means stores the compressed text into which the document information is converted by said text compression section. The retrieval expression conversion means converts the key information entered through said retrieval information input means into compressed key data and generates a retrieval condition expression from the retrieval condition. The character string collation means collates the compressed key data with the compressed text stored in the text storage means and outputs a collation result. The retrieval condition determination means is responsive to the collation result output from the character string collation means for determining a compressed text of document information matching the retrieval condition expression given from the retrieval expression conversion means. The expansion section expands the compressed text of document information matching the retrieval condition expression determined by the retrieval condition determination means into original document information.

Further included is a text analysis section which separates the document information input at the input section into words that can be assumed to be semantic units. The text compression section assigns a compressed code to each of the words provided by the text analysis section for conversion to a compressed text.

Further included is a code conversion dictionary in which the words that can be assumed to be semantic units and compressed codes are stored in pairs. The text compression section can make reference to the code conversion dictionary for conversion to a compressed text. The retrieval information input means further accepts words to be registered in the code conversion dictionary and the code conversion dictionary stores the words to be registered.

The text analysis section makes a lexical analysis of the document information input at the input section for separating it into words.

Further included is a thesaurus table in which a group of synonyms different in representation and a compressed code assigned to the synonyms are stored in pairs with additional identification information to identify the synonyms individually within the synonym group. The text compression section may make reference to the thesaurus table for assigning a compressed code to the group of synonyms different in representation for words in original document text and add information indicating a synonym and the identification information for conversion to a compressed text.

The retrieval expression conversion means makes reference to the thesaurus table for converting the key information into compressed key data and generating a retrieval condition expression from the retrieval condition and the character string collation means, upon detection of the information indicating a synonym, skips the identification information for collating the compressed key data with registered compressed text.

The expansion section expands the compressed text to be collated with the key information, and the character string collation means may collate the key information with restored document information.

The text analysis section recognizes a portion where a shift read of words into which two or more ways of separation for the document information can be available occurs, and adds predetermined information to the portion. The text analysis section extracts words where a shift read can occur when a shift read of words occurs. The text compression section assigns compressed codes to all of the extracted words for conversion to a compressed text, and the character string collation means can collate all of the words with the compressed key data at retrieval.

When text analysis section recognizes a portion where a shift read of words into which two or more ways of separation for document information can be available occurs, the text compression section does not convert the portion into a compressed text, the text storage means stores the portion as text data, and the character string collation means may also collate key information with the document information at retrieval.

The retrieval expression conversion means recognizes a portion where a shift read of words into which two or more ways of separation for the entered key information occurs, extracts words where a shift read can occur when a shift read of words occurs, assigns compressed codes to all of the extracted words for conversion to compressed key data, and generates a retrieval condition expression from the retrieval condition, and the character string collation means can collate all of the compressed key data with compressed text data at retrieval.

Further included are a plurality of types of the code conversion dictionary. The retrieval information input means accepts a selection specification of a dictionary to be used in response to the type of document, the text compression section makes reference to the specified code conversion dictionary for conversion to a compressed text and adds identification information to identify the used code conversion dictionary to the compressed text, and the expansion section makes reference to the code conversion dictionary identification information and uses the code conversion dictionary corresponding thereto for expanding the compressed text into original document information. In this case, the retrieval expression conversion means makes reference to the specified code conversion dictionary for converting the entered key information into compressed key data.

The text storage means stores identifier information assigned to a compressed text together with the compressed text and the retrieval condition determination means outputs the document identifier information instead of the expanded document information into which the compressed text of a suitable document is expanded by the expansion section.

Further included is image data storage means, when document information is registered, for registering image data related to the document information. The retrieval condition determination means may output the image data related to the document information instead of the expanded document information into which the compressed text of a suitable document is expanded by the expansion section.

According to the invention, there is provided an information processing system comprising an input device for inputting document information, a central processing unit which processes information, an output device for outputting the processing results, a storage device which stores document information, retrieval information input means for accepting key information to retrieve document information, and a code conversion dictionary in which pairs of character strings into which document information is separated and compressed codes are stored. The central processing unit separates document information entered through the input device into character strings; determines whether or not the character strings are those registered in the code conversion dictionary; assigns compressed codes in sequence to the character strings when they are not registered; registers them in the code conversion dictionary; converts the document information into the compressed codes to which the character strings are assigned; stores the resultant compressed document information in the storage device; and when outputting the stored document information, converts the compressed document information into the character strings corresponding to the compressed codes.

Further included is a word occurrence registration dictionary in which occurrence count information is recorded indicating the numbers of occurrences of all character strings of document information entered through the input device. When detecting the character string registration area of the code conversion dictionary becomes full, the central processing unit uses the occurrence count information and the code length of each of the character strings registered in the word occurrence registration dictionary to calculate the compression effect of each character string, and assigns compressed codes to the character strings providing the higher compression effect for registration in the code conversion dictionary.

The central processing unit can convert key information entered through the retrieval information input means into compressed key data and collate the compressed key data with compressed texts for retrieval of the compressed text matching the key data.

Further included is a thesaurus table in which a group of synonyms different in representation and a compressed code assigned to the synonyms are stored in pairs with additional identification information to identify the synonyms individually within the synonym group. The central processing unit makes reference to the thesaurus table for assigning a compressed code to the group of synonyms different in representation for words in original document text; adds information indicating a synonym and the identification information for conversion to a compressed text; at retrieval, makes reference to the thesaurus table for converting the key information entered through the input device into compressed key data and by generating a retrieval condition expression from the retrieval condition; and upon detection of the information indicating a synonym, skips the identification information for collating the compressed key data with registered compressed text.

To store document text data, the invention aims at the points that the minimum semantic units of document texts are words (nouns, verbs, conjunctions, or recursive character data strings) rather than characters and character string information of the words can be used to compress the document texts and that the compression efficiency varies depending on the occurrence count and the data length of each of the character strings.

Described below is a specific document data compression method by assigning compressed codes to words (character strings/character code strings).

First, document information (text data) is input through an input section by reading via interfaces from other information processing devices, by reading paper information through a scanner or OCR, or by entering characters directly through a keyboard. Next, a text analysis section analyzes the document information and separates it into character strings. The extracted words (character code strings) are registered in a word occurrence registration dictionary together with the numbers of their occurrences. A compressed word determination section uses the occurrence count and code length of each of the registered words (character code strings) to calculate the compression effect of each word (character code string), that is, how much each word (character code string) contributes to compression percentage (simply, the product of the occurrence count and code length is used as the compression contribution degree). Character string registration means assigns compressed codes to the selected words (character code strings) and registers them in a code conversion dictionary. Last, a text compression section converts the document information into compressed codes according to the code conversion dictionary, and the resultant compressed text data is stored in compressed text storage means.

Further, when text data is read, compressed text is retrieved according to document retrieval information and the compressed document information is expanded into the original document information according to the code conversion dictionary which was used to compress the original.

Thus, according to the invention, the text compression section which converts document information into the compressed codes assigned to the words (character code strings) enables enormous text data to be reduced without omitting any information of original documents. A document analysis technique is used for unknown document text data whose contents are undefined to separate it into words (character code strings) to which compressed codes are to be assigned, thereby eliminating the need for previously registering the words (character code strings) to which the compressed codes are assigned. Thus, proper compressed codes can also be assigned to unknown text data input, and the words providing the optimum compression effect canal ways be selected.

Further, the occurrence count and character string length of each of registered words (character data strings) are calculated to determine the words (character data strings) to which compressed codes should be assigned, thereby assigning the compressed codes to the words providing the optimum compression effect.

The invention also aims at the points that a document text compression technique is available to implement a full text search system in which shorting the processing time at retrieval is indispensable although high speed operation is not much required at registration, and that the minimum semantic units of document texts are words such as nouns, verbs, and conjunctions rather than characters and the words can be used to compress the document texts.

Described below is a document information registration and retrieval method using the document compression technique.

First, text data is input through an input section by reading via interfaces from other information processing devices, by reading paper information through a scanner or OCR, or by entering characters directly through a keyboard. Next, a text compression section collates the text data with a code conversion dictionary in which the words (character code strings) that can be assumed to be semantic units into which original document information is decomposed by a text analysis section and the compressed codes corresponding to the words (character code strings) are stored, and assigns the compressed codes for compressing the text data. The original document text may also be collated with a thesaurus table for assigning the compressed codes to compress the text data.

Further, when text data is retrieved, retrieval expression conversion means makes reference to the thesaurus table for converting entered keywords into compressed keywords. The character string collation means makes a character string collation between the compressed texts stored and the compressed keywords. The retrieval condition determination means is responsive to the collation result output from the character string collation means for determining the compressed text data of the document information matching a retrieval condition expression given from the retrieval expression conversion means. Thus, advanced retrieval processing is enabled without restoring the original document codes. Text data expansion means again expands the compressed text data of the document information matching the retrieval condition expression into the original document codes. Last, the resultant original document is output through output means such as a CRT or a printer.

Thus, according to the invention, the text compression section which converts document information into the compressed codes assigned to the words enables enormous text data to be reduced without omitting any information of original documents, and further, when a document is retrieved, advanced retrieval processing can be supported without expanding texts into original documents; a higher speed and more accurate document information retrieval system than the conventional systems can be provided for full text search system applications.

BRIEF DESCRIPTION OF THE DRAWINGS

FIG. 5 is a calculation example of compression contribution degree;

FIG. 15 is an example of conversion of synonyms to compressed keywords;

FIG. 16 is an example of collation shift processing when texts are compressed;

DESCRIPTION OF THE PREFERRED EMBODIMENTS

Referring now to the accompanying drawings, preferred embodiments of the invention will be described.

Figure 1:
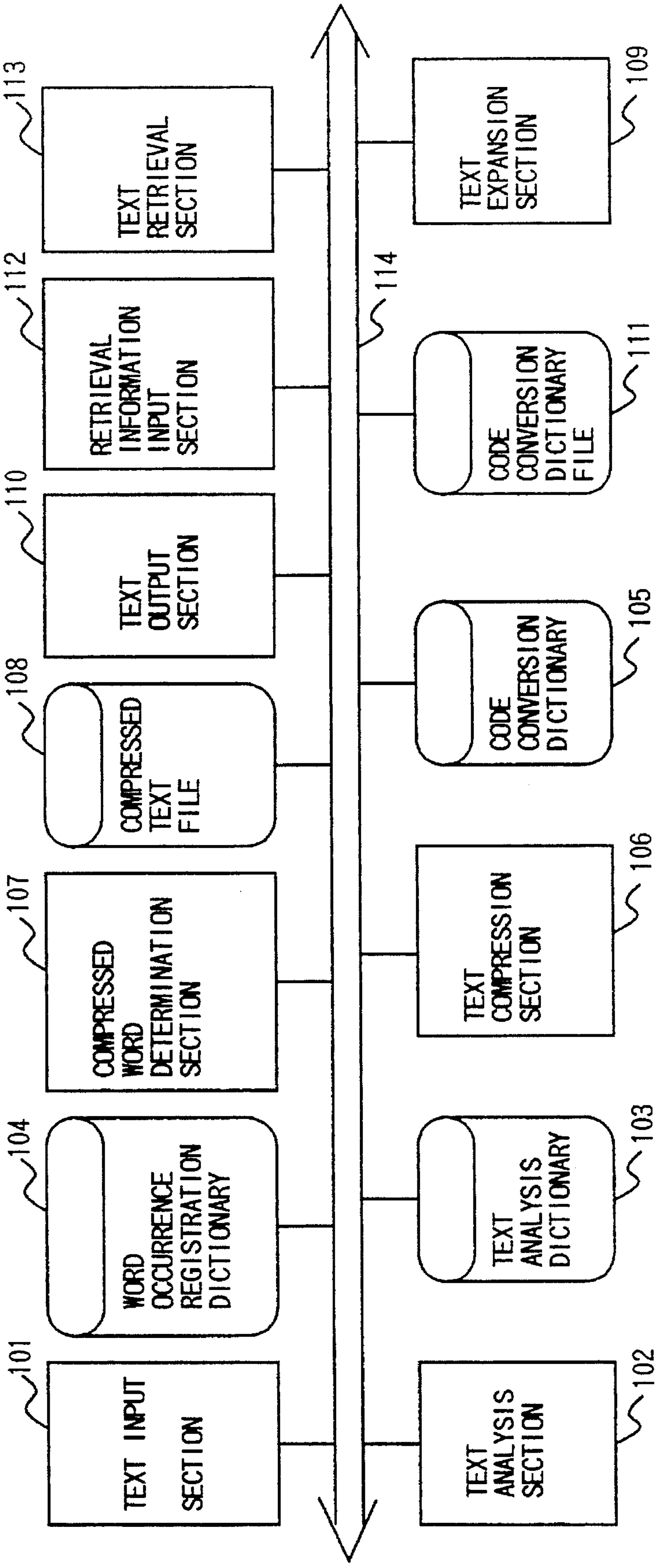
FIG. 1 is a block diagram showing a document information compression and retrieval system according to a first embodiment of the invention.

First, FIG. 1 shows the configuration of a document information compression and retrieval system according to a first embodiment of the invention, wherein numeral 101 is a text input section into which text data is read through a network or various interfaces. Numeral 102 is a text analysis section which analyzes input text data. Numeral 103 is a text analysis dictionary used to analyze text data and decompose it into word elements. Words are previously stored in the dictionary. Numeral 104 is a word occurrence registration dictionary in which analyzed words and the number of occurrences of each word are registered. Numeral 105 is a code conversion dictionary in which compressed codes, original text data, and data strings used at code compressing/expanding are related to each other for storage. Character data strings are registered in the word occurrence registration dictionary 104 and the code conversion dictionary 105 by character string registration means. The function of the character string registration means can be provided for the word occurrence registration dictionary 104 and the text analysis section 102. Numeral 106 is a text compression section which performs code conversion of the text data analyzed with the code conversion dictionary 105 for text compression. Numeral 107 is a compressed word determination section which determines a data string (word) providing an optimum compression ratio by using the word occurrence registration dictionary 104. Numeral 108 is a compressed text file of compressed text storage means. Compressed document text data is registered in the file. Numeral 109 is a text expansion section which expands a compressed text by using the code conversion dictionary 105 when document text data is read. Numeral 110 is a text output section such as a display or a printer; text data is output through various interfaces or a network. Numeral 111 is a code conversion dictionary file in which the contents of a plurality of code conversion dictionaries are registered and stored. Numeral 112 is a retrieval information input section such as a keyboard through which text retrieval information is entered when text data is retrieved. Numeral 113 is a text retrieval section which retrieves and reads texts in response to entered retrieval information. Numeral 114 is a data bus via which data can be transferred within the system.

Next, the operation of each of the blocks shown in FIG. 1 is described in detail in conjunction with functional block diagrams and flowcharts or problem analysis diagrams (PADs) when text data is registered and read.

Figure 2:
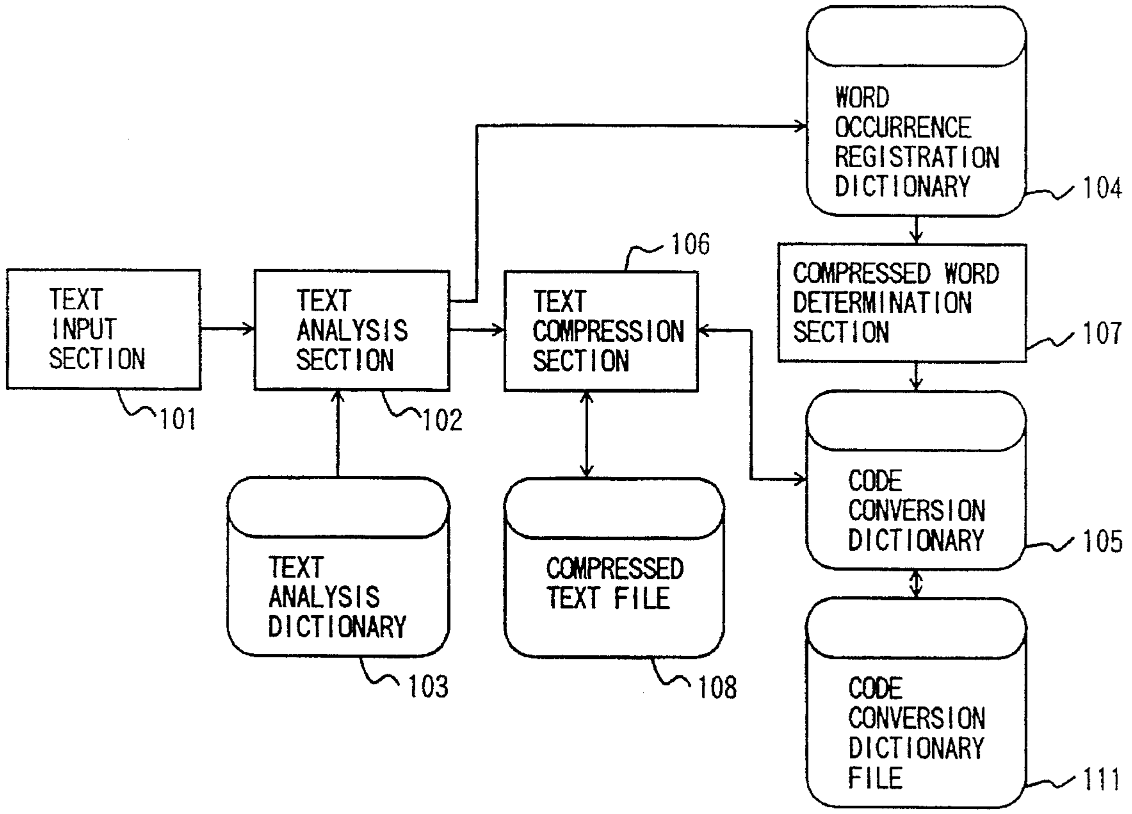
FIG. 2(*a*) and FIG. 2(*b*) are functional block diagrams of the invention.
Figure 2:
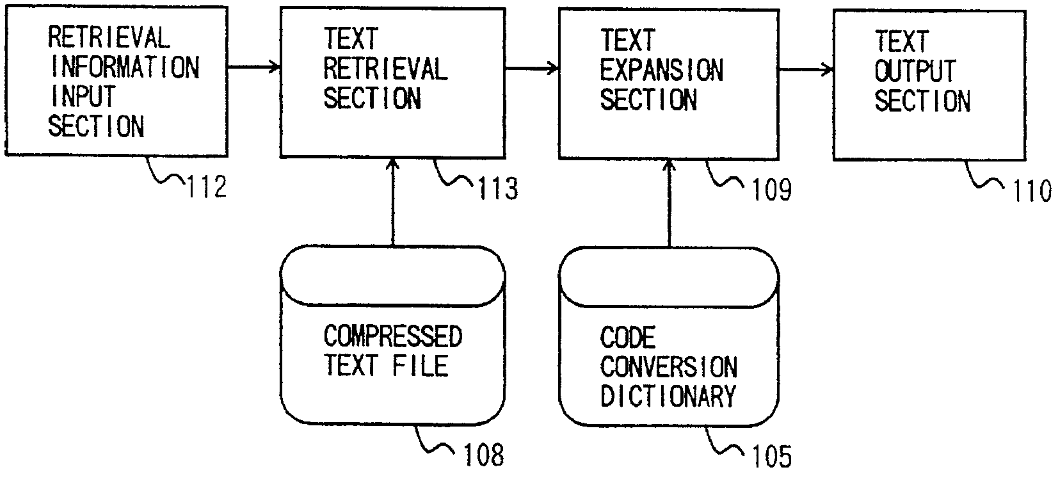
Figure 3:
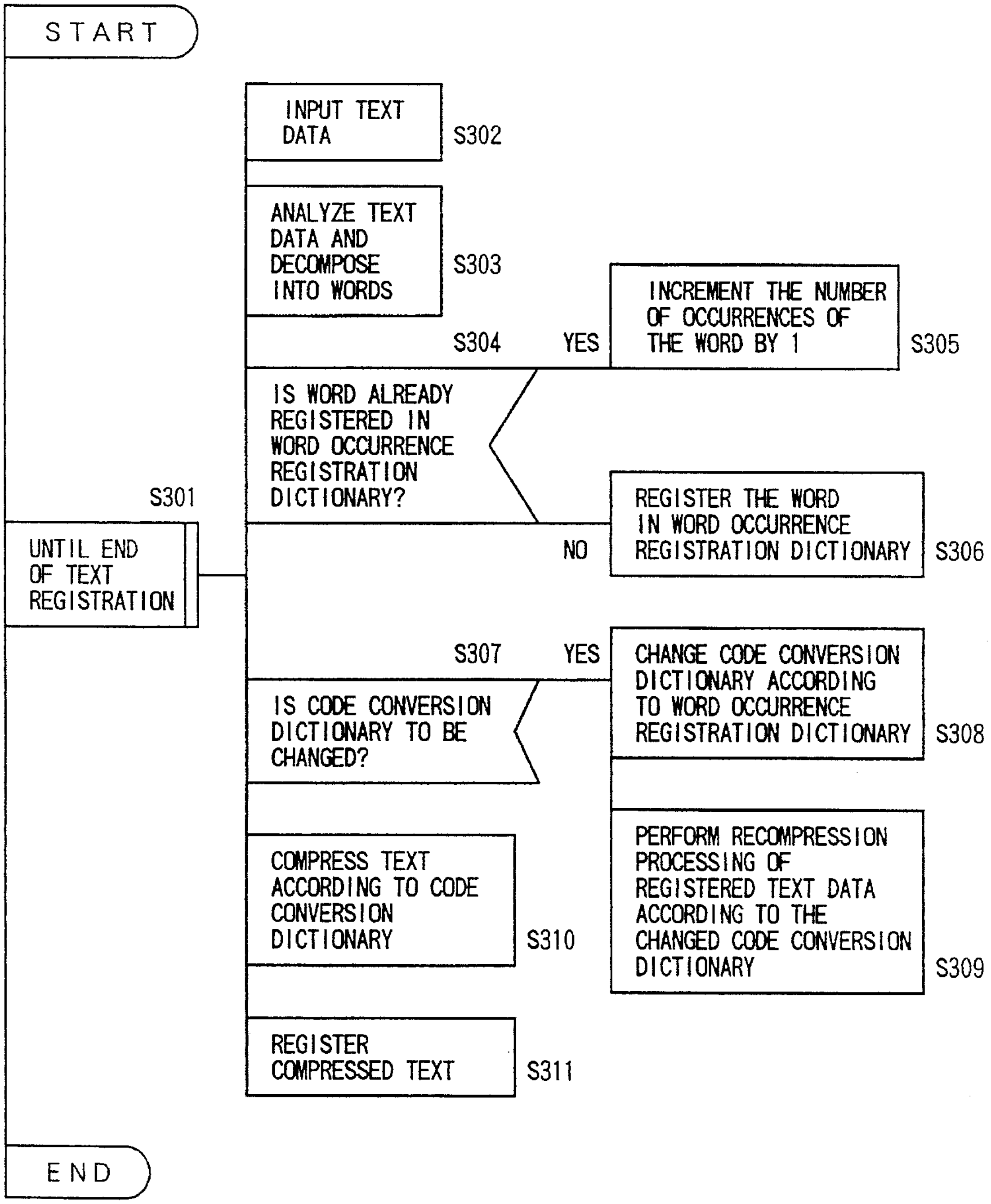
FIG. 3 is a flowchart when text data is registered.

FIG. 2(*a*) shows a functional block diagram of a data compression and registration system according to one embodiment of the invention. FIG. 3 shows a flowchart (PAD) of the operation of the data compression and registration system according to the embodiment of the invention.

First, at step S302, document information is input from the text input section 101 as text data. The text data to be input may be read from other information processing devices through a network or various interfaces. The text data may be character codes into which image data input through image input devices such as a scanner is converted by using character recognition devices such as an optical character reader (OCR), or may be text data directly entered through a keyboard. Next, at step S303, the input text data is analyzed by the text analysis section 102 as preprocessing for compressing the text data. The text analysis section 102 uses lexical analysis as an analysis technique for decomposing the text data into content words and function words such as conjunctions. The purpose of lexical analysis is to analyze document information and separate it into character string information such as particular words, i.e. predicates, and conjunctions. Further, it may be decomposed into data strings of semantic elements (words) by using the text analysis dictionary 103 in which words are prestored. Instead of lexical analysis, character string matching between the text data and text analysis dictionary 103 may be performed to extract only words registered in the text analysis dictionary 103 from the text data. If multiple match results from the character string matching, the longest word registered in the text analysis dictionary 103 may be adopted for separation.

The character data strings such as words and function words analyzed or extracted above are registered in the word occurrence registration dictionary 104. The character data strings such as words and function words analyzed or extracted from the text data input so far are registered in the dictionary 104. In addition, the number of occurrences of each character data string is counted and registered in the dictionary 104. First, at step S304, character string registration means determines whether or not a character data string analyzed or extracted from the text data is already registered in the word occurrence registration dictionary 104. At the time, if the character data string is not registered in the dictionary, the character data string or word is registered in the word occurrence registration dictionary 104 at step S306; if the character data string is already registered, 1 is added to the number of occurrences of the word at step S305.

The character data strings registered in the word occurrence registration dictionary 104 are also registered in the code conversion dictionary 105 in sequence by the character string registration means. In the code conversion dictionary 105, the character data strings analyzed or extracted from the text data and their corresponding compressed codes are registered in pairs; one compressed code is assigned to one character data string. Only the compressed codes are previously registered in the code conversion dictionary 105, then the character data strings are registered in sequence by the character string registration means.

Further, the text compression section 106 uses the code conversion dictionary 105 to replace text data words (character data strings) with their corresponding compressed codes in sequence for compressing the text data at step S312, and the compressed text data is registered in the compressed text file 108 at step S311.

If an infinite compressed code registration area is available, if a compressed code registration area is increased gradually, or when the area is not full, the compression technique is useful. However, if the compressed code registration area is limited, the code conversion dictionary 105 fills with information and the words (character data strings) extracted from the text data cannot be registered. When the compressed code registration area is finite, the following four techniques can be used:

(1) As long as compressed codes can be assigned to the character data strings analyzed or extracted from text data, they are registered in the code conversion dictionary 105, and when the compressed code registration area becomes full, the words (character data strings) registered in the code conversion dictionary are changed so as to provide an optimum compression ratio at step S307. That is, the words (character data strings) analyzed or extracted from the input text data and the numbers of their occurrences are all registered in the word occurrence registration dictionary 104, and in response to the character string length and the number of occurrences of each of the words, the compressed word determination section 107 calculates the compression effect of each word (character data string) for determining how much the word contributes to the compression effect when a compressed code is assigned to the word (compression distribution degree or registration priority in the code conversion dictionary). The compressed word determination section 107 adaptively determines compressed codes to provide the optimum compression ratio for character string information of document information from the compression effect of all character string information of document information. The character string registration means registers the optimum compressed codes and character string information determined by the compressed word determination section for replacing the words (character data strings) registered in the code conversion dictionary 105 with the words providing the optimum compression ratio at step S308. That is, if the compressed code registration area becomes full, compressed codes are assigned to words providing a higher compression ratio and no compressed codes are assigned to words providing a low compression ratio already registered in the code conversion dictionary 105.

In the technique, when the words (character data strings) in the code conversion dictionary 105 are replaced, the compressed text data registered in the compressed text file 108 cannot be expanded into the original document because the contents of the code conversion dictionary 105 are changed. Therefore, to change the contents of the code conversion dictionary 15, at step S309, recompression processing is performed for all the compressed text data registered so far. At step S309, first the compressed text data is fetched from the compressed text file 108. Next, the text expansion section 109 expands the compressed codes of the registered words (character data strings) changed in the code conversion dictionary 105 into the original character data strings. Next, the text compression section 106 uses the changed and optimized code conversion dictionary 105 to again compress all the compressed text data fetched from the compressed text file 108, some of which has been subjected to expansion processing. Last, the text data again compressed is registered in the compressed text file 108. To facilitate high-speed expansion processing, file information, such as the file names, file numbers, and file index, of files in which the word occurs can also be added to each word registered in the word occurrence registration dictionary 104 for performing expansion processing only for the files in which the word occurs.

Change processing of the code conversion dictionary 105 and recompression processing of registered text data can be performed each time document text data is input, after predetermined text data is registered, or when all text data registration is completed. To select the processing timing, the processing method may be predefined at the character string registration means and the compressed word determination section 107, or the character string registration means watches whether or not the compressed code registration area of the code conversion dictionary 105 becomes full, and when the compressed code registration area becomes full, the processing method can be selected. (2) As long as compressed codes can be assigned to the words (character data strings) analyzed or extracted from text data, they are registered in the code conversion dictionary 105, and when the compressed code registration area becomes full, registration in the code conversion dictionary 105 is terminated. That is, the character string registration means watches whether or not the compressed code registration area of the code conversion dictionary 105 becomes full, and when the compressed code registration area becomes full, the means stops new registration in the code conversion dictionary 105. After the dictionary becomes full, only the words (character data strings) of input text data which are registered in the code conversion dictionary 105 are converted into compressed codes, and words not registered in the dictionary are not compressed and are stored as they are. In this case, the compressed word determination section 107 is not required.

Words (character data strings) can also be registered directly in a code conversion dictionary, in which case the word occurrence registration dictionary 104 can also be omitted. (3) As long as compressed codes can be assigned to the words (character data strings) analyzed or extracted from text data, they are registered in the code conversion dictionary 105, and when the compressed code registration area becomes full, the code conversion dictionary 105 is stored and a new code conversion dictionary is created to register other words (character data strings). That is, the character string registration means watches whether or not the compressed code registration area of the code conversion dictionary 105 becomes full, and when the compressed code registration area becomes full, the means stores the code conversion dictionary becoming full, and creates a new code conversion dictionary. In this case, a plurality of code conversion dictionaries occur. The code conversion dictionary becoming full is registered in the compressed text file 108 together with compressed texts or registered in the code conversion dictionary file 111. Code conversion dictionary identification information, such as the serial number of the dictionary, is added to the text data registered in the compressed text file 108 in order to express which code conversion dictionary the text data is compressed with. When code conversion dictionaries are registered in the code conversion dictionary file 111, identification information of the code conversion dictionaries is also added.

When the text data is output, the text expansion section 109 uses the same code conversion dictionary as the text data is compressed for expanding the compressed texts. That is, when the compressed texts are expanded, the code conversion dictionary identification information added to the text data is judged and the same code conversion dictionary as the text data is expanded is used for expansion. In this case, the compressed word determination section 107 is not required.

Words (character data strings) can also be registered directly in a code conversion dictionary, in which case the word occurrence registration dictionary 104 can also be omitted. (4) The methods described in (1) and (3) can also be combined to provide a plurality of compression ratio optimum dictionaries described in (1). In this case, code conversion dictionaries can be replaced according to a predetermined text capacity or the target text type such as English or Japanese document or text genre. The dictionaries are registered in the code conversion dictionary file 111 or the compressed text file 108, as described in (3). Identification information of the code conversion dictionary with which the text is compressed, such as the serial number, is added, to the compressed text data.

As the character string registration means in the code conversion dictionary 105, the compression contribution degree can also be considered for registration rather than registration of all character data strings analyzed or extracted by the text analysis section. All of the words (character data strings) analyzed or extracted from input text data and the numbers of their occurrences are registered in the word occurrence registration dictionary 104. From the character string length and the number of occurrences of each of the words mentioned above, the compressed word determination section 107 calculates the compression distribution degree of each word (character data string). The calculation results are used to register only character data strings providing the compression effect of a predetermined level or higher in the code conversion dictionary. At the time, since compressed code conversion for new registered character data strings is not performed for the text data registered in the past, recompression processing is performed. Recompression processing of the registered text data can be performed each time document text data is input, after predetermined text data is registered, or when all text data registration is completed.

A part of the code conversion dictionary 105 can also be designed as text compression configuration of dictionary registration type using extraction of words (character data strings) instead of the configuration of registration of all words (character data strings) analyzed or extracted from input text data. In such a code conversion dictionary configuration, not all words (character data strings) analyzed or extracted from the input text word are registered and only specific extracted words are registered. Words other than the specific extracted words are not registered in the code conversion dictionary by using a character string collation with the code conversion dictionary. For example, when Japanese text data is input, for simplification and high-speed operation of a document analysis, only katakana words and English words (English character strings) are extracted and the character string registration means registers only the katakana words and English words (character strings) in the code conversion dictionary.

Predetermined words (character data strings) are registered in a part of the code conversion dictionary and a part can also be designed as text compression configuration using a character collation with the code conversion dictionary. In such a code conversion dictionary configuration, not all of the words (character data strings) analyzed or extracted from the input text data are registered and character strings that can be registered in the code conversion dictionary are prestored in a character string table. The character string registration means can determine whether or not character string information of input document information matches character string information stored in the character string table for registering only the matching character string information in the code conversion dictionary. Character strings not matching those listed in the character string table are subjected to only a character string collation with the code conversion dictionary and are not registered in the code conversion dictionary. For example, when Japanese text data is input, only katakana words and English words (English character strings) are prestored in the character string table and the character string registration means determines whether or not character string information matches character string information stored in the character suing table, and registers only the matching katakana words and English words (character strings) in the code conversion dictionary. In this case, character string information of Japanese text data may be registered in the code conversion dictionary and only katakana words and English words (English character strings) may be prepared in the character string table.

As a technique of character string extraction of katakana and English words (English character strings) and registration in the code conversion dictionary, without using character string matching with the text analysis dictionary 103, character type change points (from hiragana/kanji characters, etc., to katakana character string or English characters and vice versa; a space for English words is also assumed to be the character type change) can also be used for judgment to where word separation occurs for extracting katakana and English words (English character strings) and registering in the code conversion dictionary. When this technique is used, words extracted by using character type change points or word separation are registered in the code conversion dictionary in sequence as registration of only the katakana words and English words (English character strings) in the code conversion dictionary. At the time, it is not necessary to predetermine the katakana words and English words (English character strings) to be registered in the code conversion dictionary, and the character string table is not required.

When the text analysis section 102 extracts words (character code strings) by using only character string matching with the text analysis dictionary 103, the numbers of occurrences of words (character code strings) can also be registered in the text analysis dictionary 103 by using the fact that all the character data strings to be analyzed/extracted exist in the text analysis dictionary 103. At the time, the text analysis dictionary 103 has also the function of the word occurrence registration dictionary 104, and this dictionary 104 becomes unnecessary.

Figure 4:
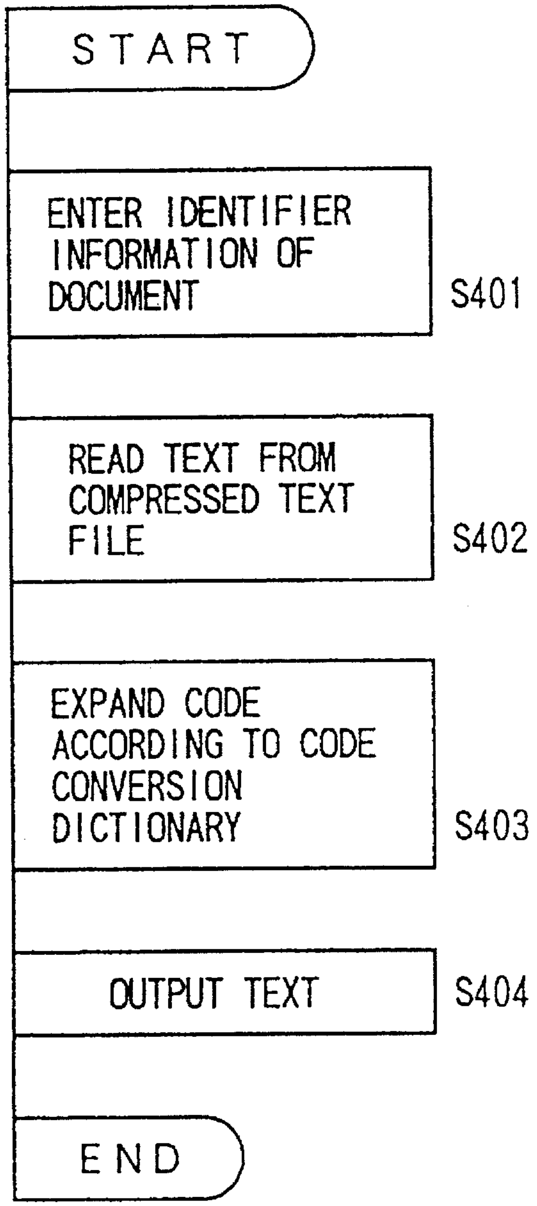
FIG. 4 is a flowchart when text data is read.

FIG. 2(*b*) shows a functional block diagram of the document information compression and retrieval system of the invention when text data is read by the system. FIG. 4 shows a flowchart or PAD when text data is read by the document information compression and retrieval system of the invention.

First, at step S401, retrieval information is entered for the target text data through the retrieval information input section 112. As the retrieval information, identifier information of the document (file name, file number, file capacity, or file index, or a combination of them) can be used or a keyword in the text data can be specified for retrieval. Retrieval information may be entered through a keyboard or may be read via a network or various interfaces from other information processing devices. Image data entered through an image input device such as a scanner may also be converted into character codes by using a character recognition device such as an OCR for entering retrieval information.

Next, at step S402, in response to the entered text data retrieval information, the text retrieval section 113 retrieves text data stored in the compressed text file 108 for taking out the target text data. The retrieved compressed text data is transferred to the text expansion section 109. At step S403, the text expansion section 109 uses the same code conversion dictionary 105 as the text is compressed for expanding the transferred compressed text data into the original text data. At step S404, the expanded text data as the original is output to the text output section in the mode desired by the retriever (user). Specifically, it is displayed on a CRT display, printed out as a hardcopy at a printer, or transferred via a network or various interfaces to other information processing devices.

The compression contribution degree calculated by the compressed word determination section 107 is described with reference to FIG. 5 wherein calculation examples of the compression contribution degree by the compressed word determination section 107 are shown. In FIG. 5, the character data strings and the numbers of occurrences are registered in pairs in the word occurrence registration dictionary 104. In the example, the registered numbers of occurrences of "文書", "情報", "テキスト", "インフォーメ", "ーション" and "圧縮" are 3,5,1,3,1, and 4 respectively. The compression contribution degree calculated by the compressed word determination section 107 using the contents of the word occurrence registration dictionary are described in examples (A) and (B).

In example (A), the compression contribution degree is calculated simply by multiplying the data length (character string length) of a character data string by the number of occurrences of the character data string, and the greater the product, the higher is the compression contribution degree of the character data string. For example, the compression contribution degree of "文書" becomes 6 because the data length is 2 and the number of occurrences is 3. The compression contribution degree of "インフォーメーション" becomes 9 because the data length is 9 although the number of occurrences is 1. As a result, the character data string "インフォーメーション" has the higher compression contribution degree than "文書".

In contrast, in Example (B), the compression contribution degree is calculated by multiplying the data length (character string length) of a character data string by the "number of occurrences −1" of the character data string for considering registration of the contents of the code conversion dictionary 105 together with the compressed text in the compressed text file 108. Character data code strings of an original text and their corresponding compressed codes are registered in pairs in the code conversion dictionary 105. When the data in the code conversion dictionary 105 is registered in the compressed text file 108 together with the compressed text data, since the character data code strings of the original text are registered in the code conversion dictionary 105, all the character data code strings of the original text corresponding to the compressed codes are always contained once in the compressed text file 108 as the contents of the code conversion dictionary 105. Therefore, the first compressed code conversion does not contribute to reduction of the file capacity (compressed text data+code conversion dictionary data). For example, in Example (B), even if "テキスト" and "インフォーメーション" whose occurrence counts are each 1 are converted into compressed data, they do not contribute to reduction (compression) of the file capacity because the original character data strings are contained in the code conversion dictionary data. Since the data length and the number of occurrences of "文書" are 2 and 3, the compression contribution degree of the character data string becomes 4 by calculating 2×(3-1).

Further, the compression contribution degree calculated by the compressed word determination section 107 can be registered in the word occurrence registration dictionary 104 together with the character data string and the number of occurrences.

Thus, the compressed word determination section 107 can calculate the compression contribution degree as shown in Examples (A) and (B) for compressing character data strings providing a higher compression contribution degree. Next, the operation of analysis to registration of text data is described specifically in conjunction with an example of text analysis and compression shown in FIG. 6.

Figure 6:
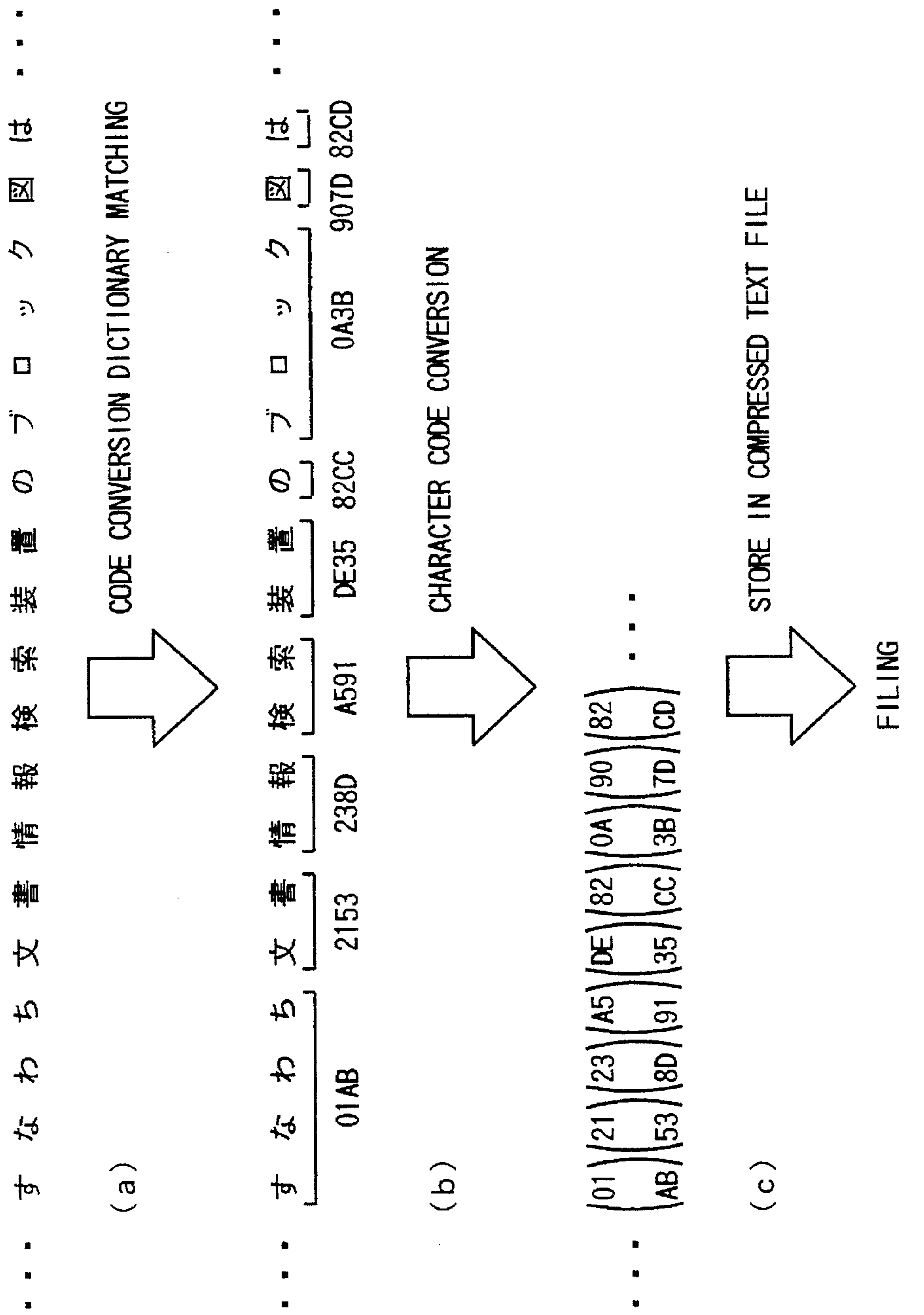
FIG. 6 is an example of text analysis and compression.

FIG. 6(*a*) shows a part of an original document text. Here, the text part "すなわち文書情報検索装置のブロック図は" is considered. FIG. 6(*b*) shows the expansion results of words into which the text part is analyzed and separated. FIG. 6(*c*) shows the results of assignment of compressed codes to the words.

First, the input text is decomposed into word elements by the text analysis section 102. When lexical analysis is used as a analysis method, the text data is decomposed into words of minimum semantic units (character data strings) as "すなはち"→conjunction, "文書"→noun, "情報"→noun, "検索"→noun, "装置"→noun, "の"→postpositional particle. The "ブロック"→noun, "図"→noun, and "は"→postpositional particle. The extracted words (character code strings) are registered in the word occurrence registration dictionary 104 or the code conversion dictionary 105.

An example is given in which character string matching with the text analysis dictionary 103 is used as an analysis method. First, the above-mentioned text data is input. The text analysis section 102 collates the input text data with the words (character code strings) registered in the text analysis dictionary 103 one character at a time from beginning to end. The words matching the words (character code strings) registered in the text analysis dictionary 103 as a result of the character string collation are extracted from the text data, and registered in the occurrence word registration dictionary 104 or the code conversion dictionary 105. The example assumes that all of the words "すなわち", "文書", "情報", "検索", "装置", "の", "ブロック", "図", and "は" are already registered in the text analysis dictionary 103. If the word "ブロック" is not registered in the text analysis dictionary 103, it is not extracted and is expanded into the character codes "ブ", "ロ", "ッ", and "ク". If the input text data matches multiple words (character code strings) registered in the text analysis dictionary 103, the first collated word takes precedence and the longer word (character code string) is extracted. For example, if "なわ" and "すな" are registered in the text analysis dictionary 103 in the example shown in FIG. 6, "すなわち" matches "なわ" and "すな" are not extracted. Even if the word "書情報" is registered, it is not extracted because "文書" takes precedence. In addition to this technique, another technique for handling multiple match is available in which longer words (character code strings) are preferentially extracted independently of the occurrence positions of the words for improvement of the compression percentage.

Next, the text compression section 106 converts the extracted words (character code strings) into compressed codes. For the original document text, one code is assigned to one character. For example, in the shift JIS code generally used as text code, one 16-bit code is given to one character. In the example given above, nineteen 16-bit codes are required. Then, new 16-bit compressed codes are assigned to the extracted words to compress the document text. In the example, 16-bit codes are assigned to the words in such a manner that (01AB) is assigned to "すなわち", (2153) to "文書", and (0A3B) to "ブロック", as shown in FIG. 6(*b*). The words (character code strings) of the original document, such as character code string of "ブロック", and the compressed character codes corresponding to them, such as "0A3B", are registered in pairs in the code conversion dictionary 104. However, code information of each character should also be supported after compressed text conversion. This applies to "の", "図", and "は" in the example given above. Thus, the text data shown in FIG. 6(*b*) is converted into the compressed text data shown in FIG. 6(*c*) by the text compression section 106 for filing in the compressed text file 108. In the example, the text part is converted into a text of nine 16-bit codes as a result of compression, providing the compression effect of compression percentage 50% or higher. The text capacity can be reduced by about 50% and the read time from storage media such as a disk can be halved by using the compression technique in the example.

Figure 7:
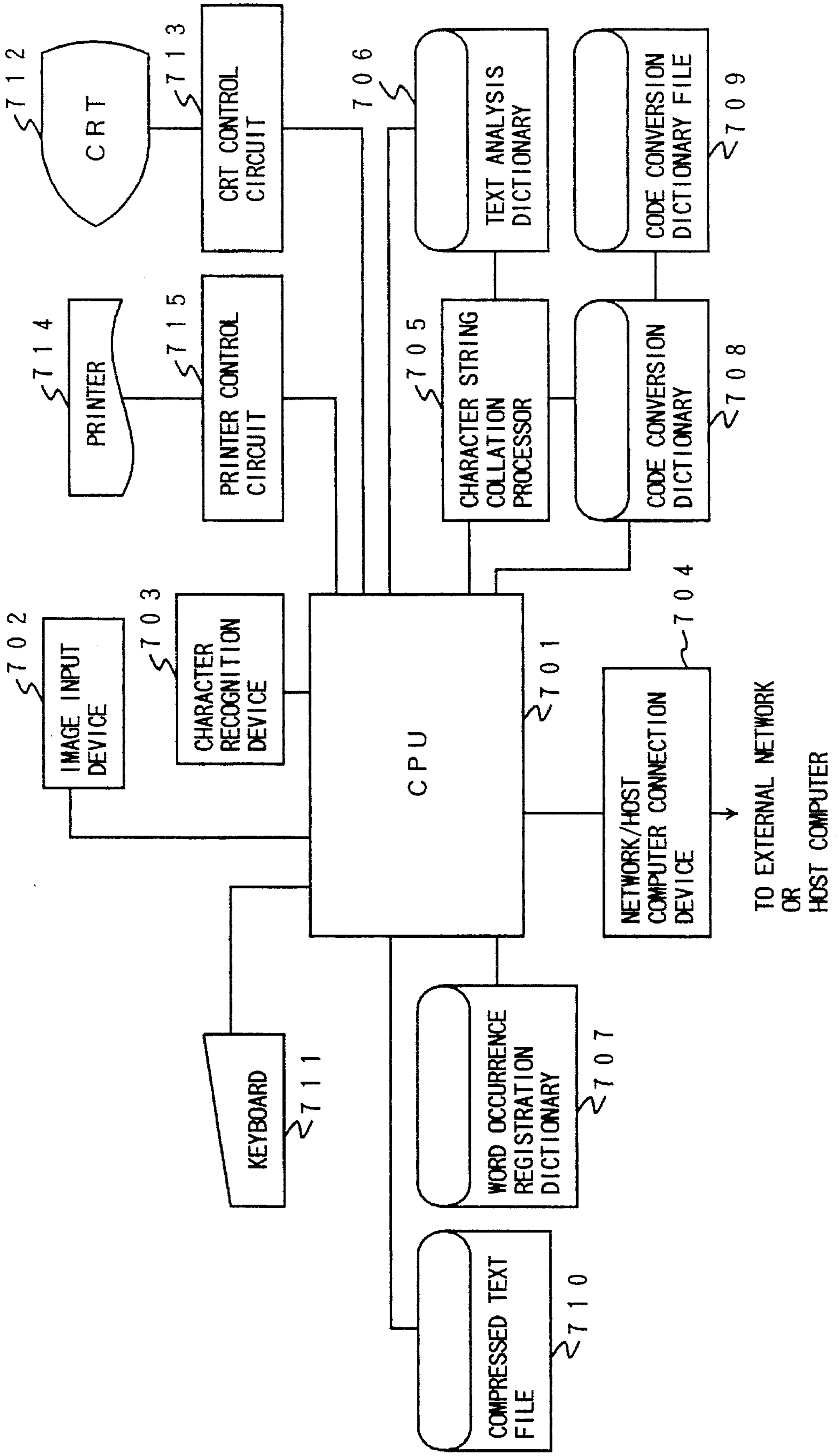
FIG. 7 is a configuration example of an information processing system to which the first embodiment of the invention is applied.

FIG. 7 shows a configuration example of an information processing system to which the first embodiment of the invention is applied.

In FIG. 7, numeral 701 is a CPU (central processing unit) which processes text/image data, keywords and retrieval conditional expressions, document identifier information, etc. Numeral 702 is an image input device, one device of the text input section 101, for reading image data from hardcopies, etc. Numeral 703 is a character recognition device which extracts and recognizes only character components from the read image data for conversion into text data. Numeral 704 is a network/host computer connection device, one device of the text input section 101, for reading text/image data via a network from various external systems or devices. The image input device 702 and the character recognition device 703 can be provided as input devices. Numeral 705 is a character string collation processor which collates character strings at the text analysis section 102 and executes character string collation operation at high speed by using automaton and other character collation algorithms. Numeral 706 is a text analysis dictionary used to analyze input text data and decompose into word elements. Numeral 707 is a word occurrence registration dictionary in which the words (character data strings) analyzed/extracted from text data and the numbers of their occurrences are registered. Numeral 708 is a code conversion dictionary in which the character code strings of an original document and the compressed codes after conversion are stored in pairs. Numeral 709 is a code conversion dictionary file in which the contents of the code conversion dictionary 708 are saved. Numeral 710 is a compressed text file of a storage device which stores compressed text data after conversion. Numeral 711 is input means such as a keyboard for accepting keyword entry at retrieval or text data input as the retrieval information input section 112 or the text input section 101. Numeral 712 is output means such as a CRT for displaying the retrieval results. Numeral 713 is a CRT control circuit which controls the CRT 712. Numeral 714 is output means such as a printer for printing out the retrieval results on paper. Numeral 715 is a printer control circuit which controls the printer 714. The CRT 712 and the printer 714 can output the retrieval results as output devices.

In FIG. 7, first, when text data is registered, it is input to the CPU 701 via the network/host computer connection device 704; text data recognized and converted by the character recognition device 703 from image data entered through the image input device 702 is input to the CPU 701; or text data is directly input to the CPU 701 through the keyboard 711. The input text data is analyzed by the CPU 701 for extraction of words (character data strings). To extract the words from the input text data, the CPU 701 may make a lexical analysis by using the text analysis dictionary 706 and character string collation processor 705 or may extract only the words (character data strings) registered in the text analysis dictionary 706 by using the text analysis dictionary 706 and character string collation processor 705. The extracted words (character data strings) and the numbers of their occurrences are registered in the word occurrence registration dictionary 707 and the CPU701 calculates the compression contribution degree from the number of occurrences and the data length of each of the words (character data strings). Further, the CPU 701 registers all or some of the words (character data strings) entered in the word occurrence registration dictionary 707 in the code conversion dictionary 708 according to a registration algorithm of compressed words. The character string collation processor 705 makes a character string collation of the input text data with the words registered in the code conversion dictionary 708, and the CPU 701 uses the collation results for compression processing. The compressed text data is stored in the compressed text file 710.

Next, when text data is retrieved, retrieval information for the target text data is input to the CPU 701 through the keyboard 711, via the network/host computer connection device 704 from a network or a host computer, or through the image input device 702 and character recognition device 703. Then, in response to the input text data retrieval information, the CPU 701 retrieves text data stored in the compressed text file 710 to find the target text data. For the compressed text data fetched from the compressed text file 710, the CPU 701 uses the code conversion dictionary 708 to expand the compressed codes into the original text code strings. The restored text data as the original is displayed on the CRT 712 through the CRT control circuit 713, is printed on paper at the printer 714 through the printer control circuit 715, or is output to an external information processing system or device via the network/host computer connection device 704.

If a high-speed or high-level function is not required for a character string collation in the system configuration shown in FIG. 7, the CPU 701 executes the character string collation and the character string collation processor 705 can be eliminated. If a high-speed or high-level function is not required for character recognition, the CPU 701 executes character recognition and the character recognition device 703 can also be eliminated. When text data is input through the image input device 702 and the character recognition device 703, to consider use of dictionary matching at the character recognition device 703, the text analysis dictionary 706 can also be built in the character recognition device 703 to contain text analysis processing in character recognition processing.

According to the embodiment, when document text information is registered, text codes are compressed and saved in the compressed text file, thus enormous text data can be reduced without omitting original text information. When document text information is retrieved, compressed text data is read, thus the processing time required to read from the text storage means (disk) can be shortened.

According to the embodiment, in the technique of compressing text codes by replacing one character data string with one code, an input document is decomposed into character data strings such as content words and function words by using the text analysis technique and compressed codes are assigned to the extracted character data strings with a one-to-one correspondence, thereby generating the compressed codes appropriate for the input document. Further, if a compressed code area (the number of compressed codes) is limited, the number of occurrences and the data length of each character data string are considered to determine the character data strings to be compressed, thereby enabling code conversion providing the optimum compression percentage. The effect of the system is remarkable particularly when it is necessary to store and retrieve enormous document texts.

A document information compression and retrieval system according to a second embodiment of the invention is described in conjunction with the accompanying drawings.

Figure 8:
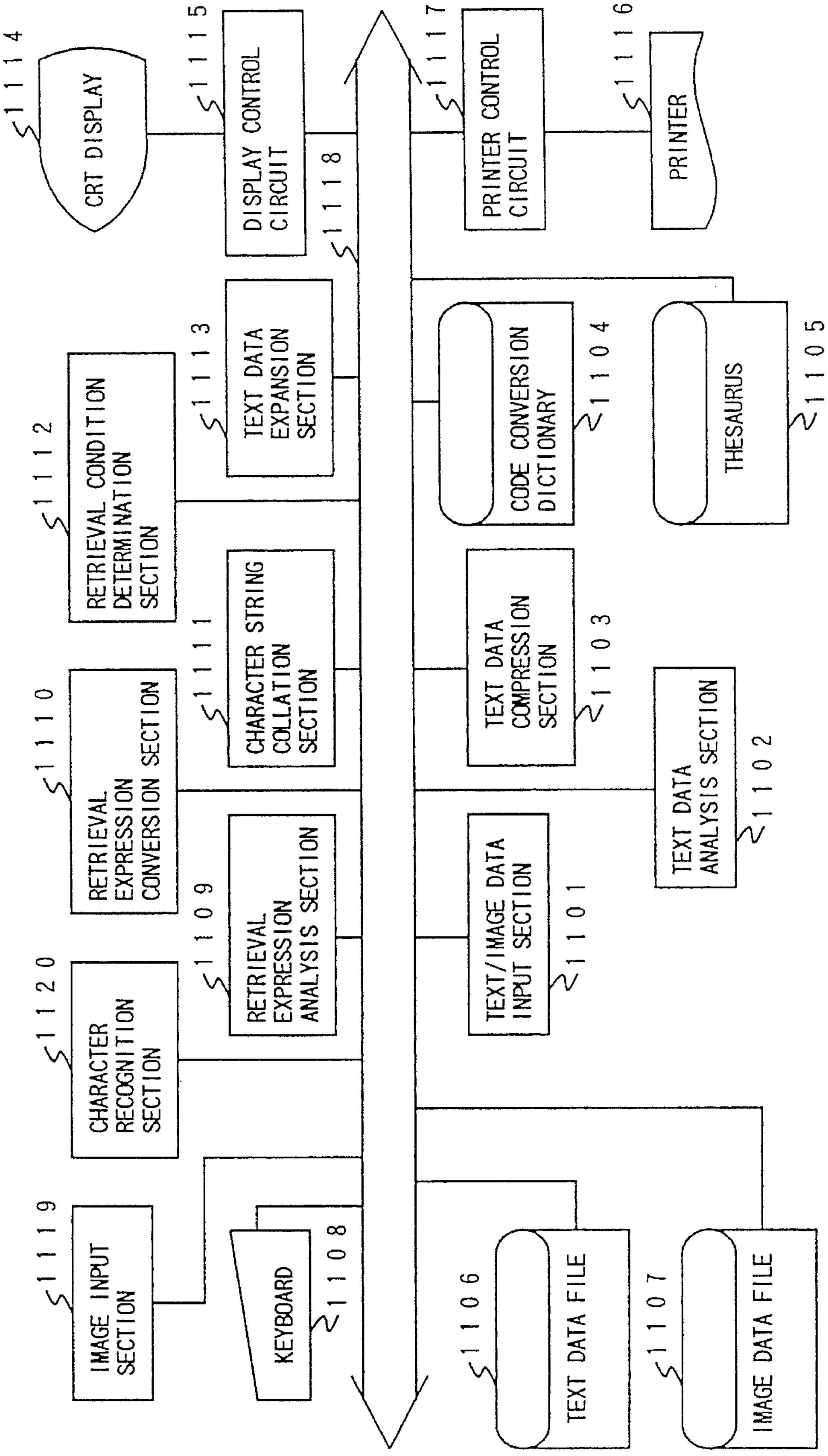
FIG. 8 is a block diagram showing a document information compression and retrieval system according to a second embodiment of the invention.

FIG. 8 shows the configuration of the document information compression and retrieval system.

In FIG. 8, numeral 1101 is a text/image data input section, which corresponds to the text input section 101 in the first embodiment, into which text data and image data are read through a network or various interfaces. Numeral 1102 is a text data analysis section which corresponds to the text analysis section 102 in the first embodiment and analyzes input text data. Numeral 1103 is a text data compression section which corresponds to the text compression section 106 in the first embodiment and compresses text codes according to text data analysis results. Numeral 1104 is a code conversion dictionary in which code data pairs of compressed codes and original character codes are stored at code compressing/expanding. Numeral 1105 is a thesaurus in which words and their synonyms are collected. Numeral 1106 is a text data file, which corresponds to the compressed text file 108 in the first embodiment, in which compressed text data is stored. Numeral 1107 is an image data file in which image data involved in text data is stored. Numeral 1108 is input means such as a keyboard, which corresponds to the retrieval information input section 112 in the first embodiment, through which text data of document information is entered when document information is registered and keywords/retrieval conditions are entered when texts are retrieved. Numeral 1109 is a retrieval expression analysis section which corresponds to the text retrieval section 113 in the first embodiment and decomposes input retrieval expressions into keywords and retrieval conditions, etc., or analyzes them. Numeral 1110 is a retrieval expression conversion section, a function contained in the text retrieval section 113 in the first embodiment, which expands input keywords according to retrieval information and further converts into retrieval words (compressed key data) adaptable to compressed text data retrieval. Numeral 1111 is a character string collation section, a function contained in the text analysis section 102 in the first embodiment, which collates input text data with words stored in the code conversion dictionary 1104 when texts are registered and collates generated retrieval words with compressed text data read from the text data file when texts are retrieved. Numeral 1112 is a retrieval condition determination section, a function contained in the text retrieval section 113 in the first embodiment, which determines a document was suitable for retrieval condition expressions output by the retrieval expression analysis section for the collation result output by the character string collation section. Numeral 1113 is at ext data expansion section, corresponding to the text expansion section 109 in the first embodiment, which reads out compressed text data from the text data file for the retrieval result provided by the retrieval condition determination section and expands the compressed text data. Numeral 1114 is display means such as a CRT display for displaying text and image data. Numeral 1115 is a display control circuit which controls the display 1114. Numeral 1116 is output means such as a printer for printing text and image data on paper as hard copies. Numeral 1117 is a printer control circuit which controls the printer 1116. The display control circuit 1115, the display means 1114, the printer control circuit 1117, and the printer 1116 correspond to the text output section in the first embodiment. Numeral 1118 is a text/image data bus via which data is transferred in the system. Numeral 1119 is an image input section such as a scanner through which image information is read as data. Numeral 1120 is a character recognition section such as an OCR which extracts character information from the read image data and recognizes it. The image input section 1119, the character recognition section 1120, and the text/image data input section 1101 correspond to the text input section in the first embodiment.

Next, the operation of each of the blocks shown in FIG. 8 is described in detail in conjunction with flowcharts or problem analysis diagrams (PADs) when text data is registered and retrieved.

Figure 9:
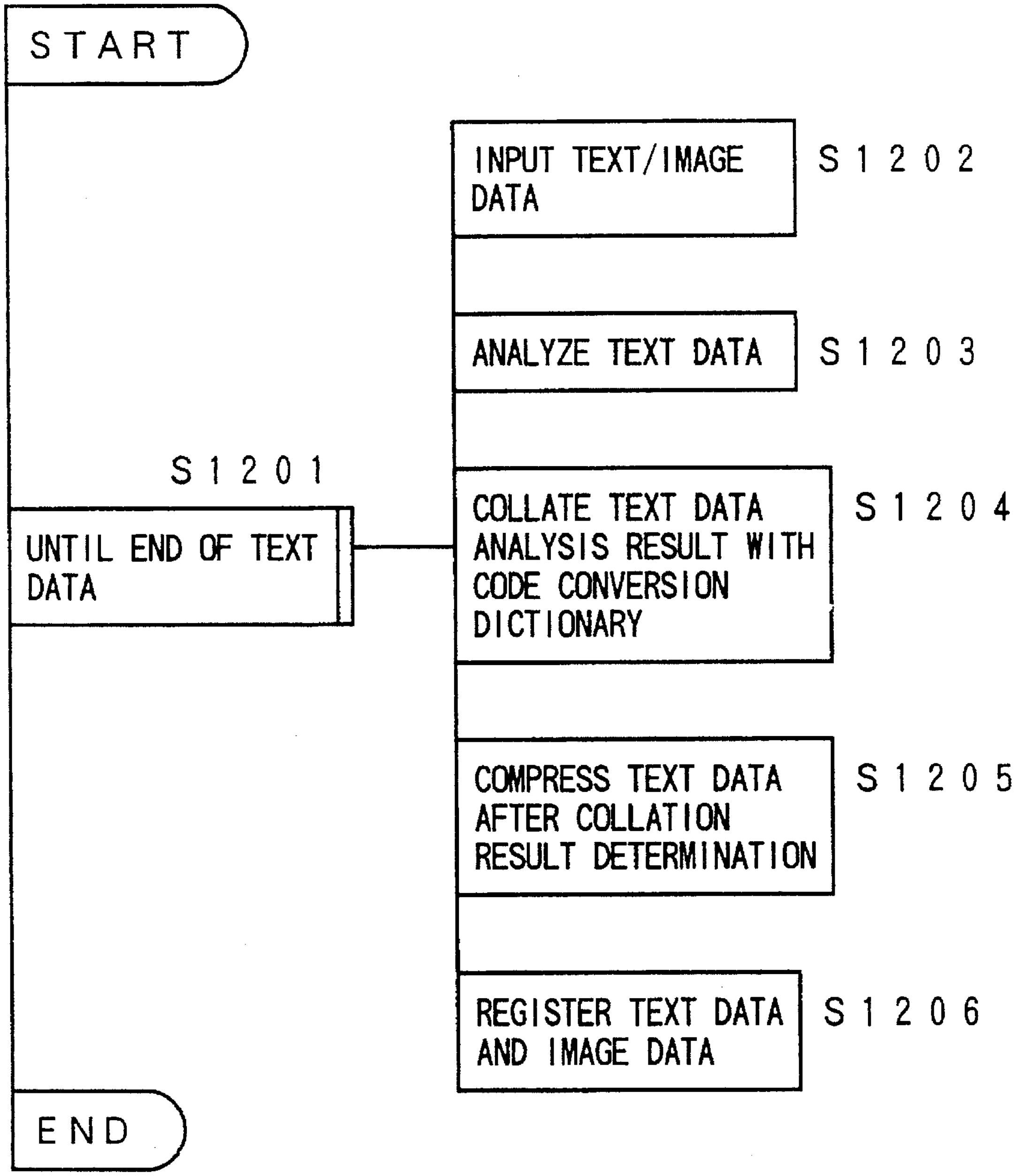
FIG. 9 is a flowchart when text data is registered.

FIG. 9 shows a flowchart (PAD) of the operation of the data registration system according to the embodiment of the invention.

First, at step S1202, text data is input for registration. The text data to be input may be read through the text/image data input section 1101 from other information processing devices via a network or various interfaces, may be character codes into which image data input through the image input section 1119 such as a scanner is converted by using the character recognition section 1120 such as an OCR, or may be text data directly entered through the keyboard 1108. Next, at step S1203, the input text data is analyzed by the text data analysis section 1102 as preprocessing for compressing the text data. This step is executed to prevent a collation slip or shift of words from occurring on a collation with the code conversion dictionary required at the next step. As one processing technique, Japanese lexical analysis processing is used to decompose text data into words, predicates, conjunctions, etc., for recognition. As another processing technique, only portions where a collation slip or shift of words occur are recognized and when a dictionary collation is made, the recognition result is fed into the character string collation section for removing the collation slip or shift. In the former technique, Japanese lexical analysis processing is performed for input text data and the text data is decomposed into words, predicates, conjunctions, etc., for recognition. The latter technique is described below.

Further, at step S1204, the document whose text data has been analyzed at step S1203 is collated with the code conversion dictionary 1104 and compressed codes for the analysis results are generated. The code conversion dictionary 1104 contains pairs of word codes of original document texts and their corresponding compressed codes; the dictionary is stored on a magnetic disk depending on the size of the dictionary or is located in a semiconductor memory intended for high speed operation. The text data analyzed by the text data analysis section 1102 is collated with the text word data registered in the code conversion dictionary 1104 by the character string collation section 1111 for providing compressed codes at word level as the collation results. The collation results generated by the character string collation section 1111 are transferred to the text data compression section 1103. Then, at step S1205, the text data compression section 1103 uses the analysis results from the text data analysis section 1102 and the transferred collation results, namely compressed codes at word level, for text compression processing. Last, at step S1206, the compressed text data is registered in the text data file 1106. To register the text data, an optical disk can be used for a large capacity or a magnetic disk can be used for increasing the retrieval speed. The registration process is repeated until the end of the text data is reached (S1201).

In the embodiment, image data related to text data can also be input at step S1202 for registration in the text data file 1106 together with the text data or in another file (image data file 1107) together with the text data. Management information on the image data related to the text data is attached to the text data for storage.

In the embodiment, when a character string collation is made between the text data and the code conversion dictionary 1104, synonyms can also be assumed to have the same meanings at word level by using the thesaurus 1105 for assigning one code to the synonyms in original text data for compressing the text data.

Figures 13, 14:
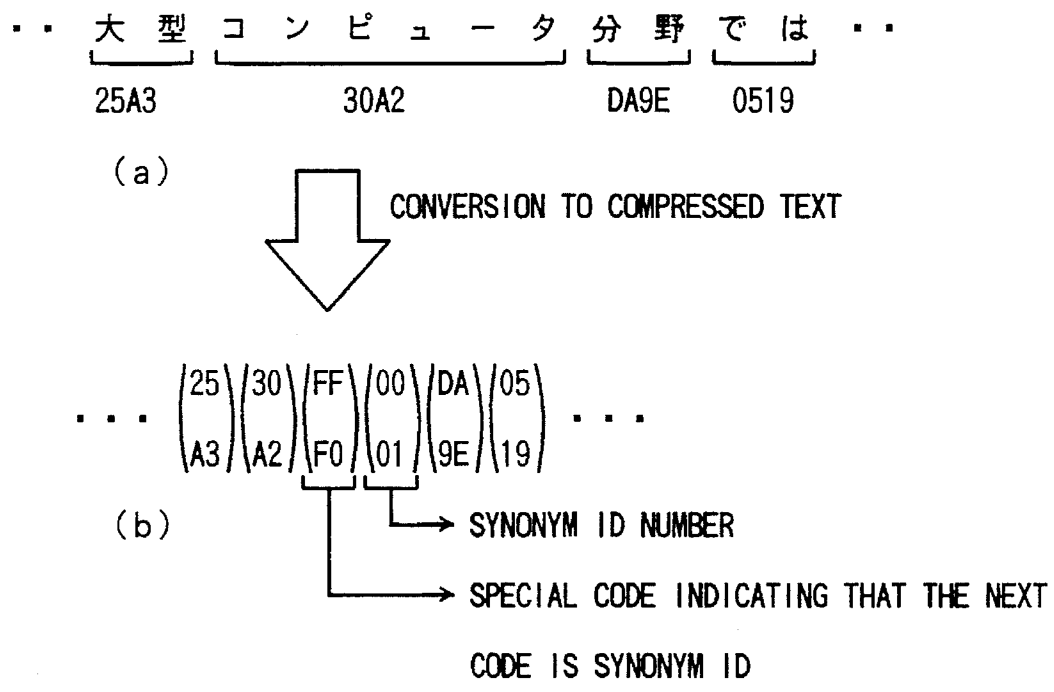
FIG. 13 is an example of a synonym table.
FIG. 14 is an example of code assignments for conversion of synonyms to compressed text.

Next, code assignments to the synonyms and retrieval are described in conjunction with FIGS. 13 to 15. FIG. 13 shows an example of a synonym table. FIG. 14 shows an example of code assignments for conversion of synonyms to a compressed text. FIG. 15 shows an example of conversion of synonyms to compressed keywords.

To assign one code to synonyms in original text data for compressing the text data, a synonym table as shown in FIG. 13 is provided in the thesaurus 1105 or as the code conversion dictionary 1104. In the synonym table, one compressed code is assigned to a group of synonyms and is followed by ID numbers given to the synonyms. For example, as shown in FIG. 14, if the original text data "大型コンピュータ分野では" is entered, compressed code (30A2) is assigned to "コンピュータ" for converting the original into a compressed text. The compressed code is followed by special code (FFF0) to indicate that the next code is synonym ID, followed by synonym ID number (0001). These are registered as compressed text. When a retrieval is made, a group of synonyms are handled as the same keywords and the synonym IDs are skipped for a collation. For example, if the keyword "大型計算機分野" as shown in FIG. 15 is given, the thesaurus 1105 is used and the compressed codes corresponding to the element words of the keyword are assigned. When the compressed keyword is collated with compressed text data, if the special code (FFF0) is encountered, the following synonym ID is skipped for a collation. At conversion to compressed keyword, existence of synonyms is detected, and when the compressed code assigned to the synonyms is collated, the following special code (FFF0) and synonym ID number may be skipped for collation. At expansion, synonym ID numbers and the synonym table are used to restore compressed text data to original text data.

According to the flow described above, compressed codes can be assigned to text data for registering the compressed text data in the text data file or image data file.

Figure 10:
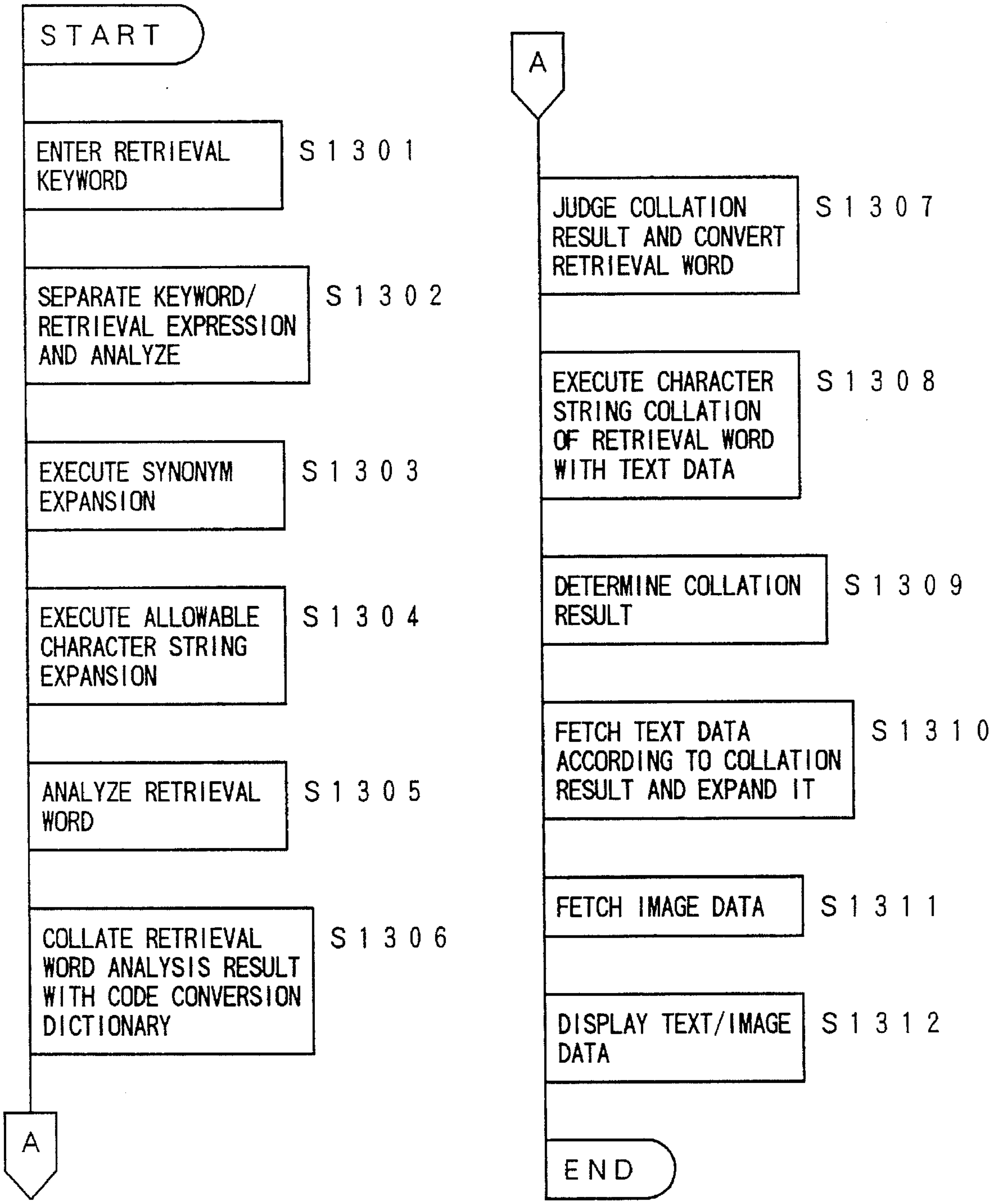
FIG. 10 is a flowchart when text data is retrieved.

Next, an operation flow of retrieving text data is described in conjunction with FIG. 10 which shows a flowchart (PAD) of an example of a text data retrieval system according to the second embodiment of the invention.

First, at step S1301, a text retrieval keyword and retrieval expression are entered. The keyword and retrieval expression may be entered through the keyboard 1108, may be input through the text/image data input section 1101 from various information processing devices via interfaces, or may be character code information into which paper information such as prints (image data) input through the image input section 1119 such as a scanner is converted by using the character recognition section 1120 such as an OCR. Next, at step S302, the entered one or more keywords and retrieval expressions are transferred to the retrieval expression analysis section 1109 and the keywords are separated and retrieval conditions between the keywords are analyzed and recognized. According to the retrieval conditions, the thesaurus 1105 is used to execute synonym expansion for the keywords at step S1303 or allowable character string expansion (for keyword expansion to enable a retrieval in which an input character error of one character or specified characters is allowed) is executed at step S1304. Then, at step S1305, as in text data registration, the keywords are analyzed by the text data analysis section 1102 as preprocessing for conversion to compressed codes. This step is executed to prevent a collation slip or shift of words from occurring when a collation with the code conversion dictionary is made at the next step. At step S1306, the keyword analysis result is collated with the code conversion dictionary, and at step S1307, the compressed code matching the keyword analysis result as a result of the collation is used to generate the compressed code of the keyword. The code conversion dictionary 1104 is used for code conversion. The character string collation section 1111 collates the keyword with the code conversion dictionary and the text data compression section 1103 uses the collation result to perform keyword compression processing for generating the compressed code of the keyword.

Conversion of the keyword to the compressed code is now complete. Then, at step S1308, a character string collation of the keyword with text data is made at compressed code level. Compressed text data is fetched from the text data file 1106 and the keyword is collated with the fetched text data by the character string collation section 1111. In the embodiment, both the keyword and text data are compressed by the same technique and character string retrieval and collation are executed directly for the compressed text data, thereby eliminating the need for expanding into original document texts when a text data collation is executed; text collation can be simplified and executed at high speed. At step S1309, the character string collation result between the keyword and text data is transferred to the retrieval condition determination section 1112 which then determines the collation result according to the retrieval conditions output by the retrieval expression analysis section 1109. At step S1310, the document or document part matching the retrieval conditions is transferred from the character string collation section 1111 or is again fetched from the text data file 1106 and fed into the text data expansion section 1113 which then expands the received compressed text data into original document text data for displaying the text data on the CRT display 1114 through the display control circuit 1115 or printing it out on paper at the printer 1116 through the printer control circuit 1117.

In the embodiment, when text data is registered or retrieval words are entered, it may be impossible to remove a collation slip or shift of words. For example, when the word string "過去それはともあれ現在" is encountered as shown in FIG. 16(*a*), a collation slip or shift can occur. To solve this problem by the text data analysis section, the following techniques can be used:

① When text data is retrieved, all keywords which can occur due to a shift read are converted into compressed codes at the retrieval word analysis step (S1305), and the compressed codes of the keywords are collated with text data;

② when text data is registered, some mark is added to candidates to indicate that they are shift read candidates at retrieval for words that can be read as a shift read; and ③ for words that can be read as a shift read, original document text codes are registered without conversion to compressed codes and when text data is retrieved, keywords are converted into both compressed codes and original document text codes.

In technique ①, when a shift read of a keyword at retrieval occurs, all words that can be read as the keyword are listed and converted into compressed codes. For "過去それはともあれ現在" shown in FIG. 16(*a*), a shift read can occur in the part "それはともあれ", thus "それは" and "ともあれ" and "それ", "はと", "も", and "ともあれ" are converted into compressed codes. These compressed codes are collated with text data.

In technique ②, when text data is registered, each word that can be read as a shift read is both preceded and followed by predetermined codes indicating a possibility of a collation shift. For example, as shown in FIG. 16(*b*), (FFFC) is used as a collation shift start code and the compressed code of the first candidate is described. Next, (FFFF) is used to indicate the beginning of another candidate and the second candidate is described. Further, if other candidates exist, likewise, (FFFF) is used and the remaining candidates are described. Last, (FFFE) issued as a collation shift end code and text data is registered.

Figure 17:
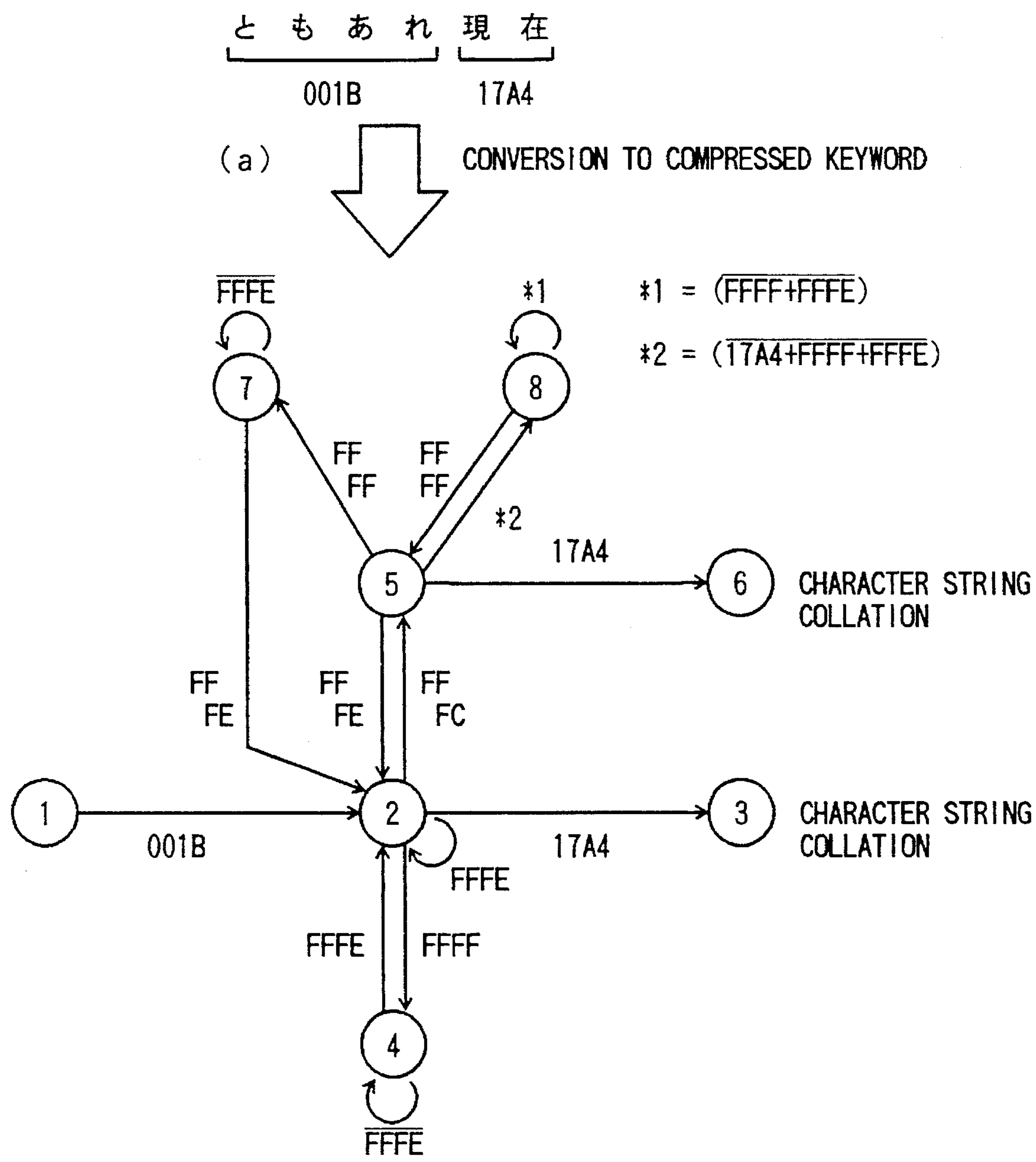
FIG. 17 is an example of keyword conversion for collation shift text retrieval.
Figure 18:
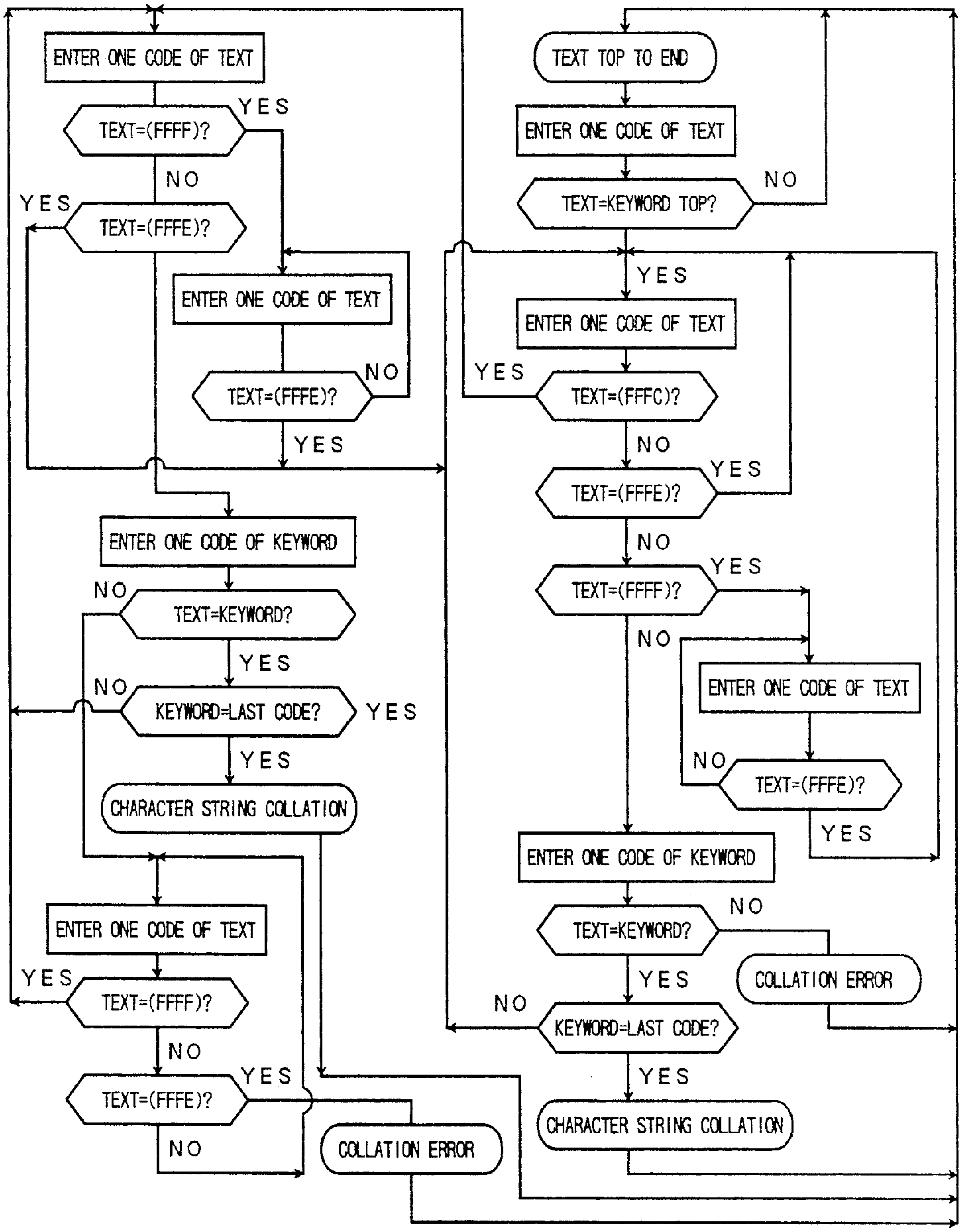
FIG. 18 is a flowchart of a collation shift text retrieval algorithm.

Next, the retrieval method related to technique ② is described in conjunction with FIGS. 17 and 18. FIG. 17 shows a state transition diagram of keyword conversion for collation shift text retrieval. FIG. 18 shows a collation shift text retrieval algorithm. For retrieval of a compressed text containing a collation shift, special codes (FFFC), (FFFF), and (FFFE) are used as described above, thus special processing must be performed at retrieval when the special codes exist. In FIG. 17, to collate a normal compressed text which is not a collation shift text as a keyword, the state transition is made like ①→②→③ for the character string collation. If a collation shift text is encountered during the collation, the state transition is made as ⑤, ⑦ and ⑧. If a collation with a keyword is started at an intermediate point of a collation shift, the state transition can be made as ② and ④. In FIG. 17, when "ともあれ現在" is entered as keyword, the keyword is converted into a compressed code and a collation is made with the compressed keyword. According to the flow shown in FIG. 18, compressed text is read one code at a time for a collation. When the special code (FFFC) indicating the collation shift start position is read in the compressed text, a number of candidates are read as compressed codes containing a possibility of a collation shift and are collated with the compressed keyword.

In technique ③, for words that can be read as a shift read, original document text codes are registered without conversion to compressed codes. When text data is retrieved, keywords are converted into both compressed codes and original document text codes and both types of codes are used for retrieval, thereby preventing a shift read from occurring.

This technique enables omission of the text data analysis section 1102 and the text data analysis step(S1203) when text data is registered and the retrieval word analysis step (S1305) when text data is retrieved; compressed codes can be generated only by matching with the code conversion dictionary 1104.

In the embodiment, the types of code conversion dictionary can be changed or a number of code conversion dictionaries can be provided in response to the target texts.

For example, code conversion dictionaries for English texts, technical terms, general business terms, etc., can be considered. The dictionary to be used can be selected according to the document type by the input means 1180 through which a selection instruction is accepted. At the time, the same dictionary is used for document text compression and retrieval/expansion. To indicate which dictionary is used for compression, dictionary management information is added to compressed text data and stored in the text data file 1106 for code conversion dictionary management.

Further, in the embodiment, the image data registered together with text data when the text data is registered can also be fetched from the image data file 1107 together with the text data according to the text retrieval result for displaying on the display 1114 or printing at the printer 1116. Instead of displaying original text data on the display 1114 or at the printer 1116 as the text retrieval result, text management information such as the file name/index of the file containing the original text data can be displayed or information of image data, etc., related to the original text data can be displayed. As a technique of displaying the management information, at least one of the file name/index, file number, file capacity, etc., of the original text data is registered in the text data file 1106 as identifier information, and instead of expanding the compressed text data of a suitable document, the retrieval condition determination section 1112 may output the identifier information of the document. As a technique of displaying information of image data, etc., image data related to document information is stored in the image data file 1107, and instead of expanding the compressed text data of a suitable document, the retrieval condition determination section 1112 may output the image data related to document information.

The techniques eliminate the need for reexpanding compressed text data into original document text data.

Further, in the embodiment, to support retrieval conditions hard to support with compressed texts such as character distance specification (retrieval with specification of the number of characters contained between occurrences of two or more words) at character string collation between text data and keyword (S1308), without using the technique of converting retrieval words into compressed codes, the compressed text read from the text data file may be expanded by the text data expansion section 1113 into the original document text for a character string collation with the keyword. At the time, the retrieval word analysis step (S1305), the collation of retrieval word with code conversion dictionary (S1306), and the keyword compression step (S1307) need not be performed. At the character string collation, the original document text after expansion or the compressed text can be selected for the collation by entering an instruction through the keyboard 1108.

Further, in the embodiment, text data can also be expanded by the display control circuit and the printer control circuit. At the time, the text data expansion section 1113 is contained in the display control circuit 1115 and the printer control circuit 1117.

Figure 11:
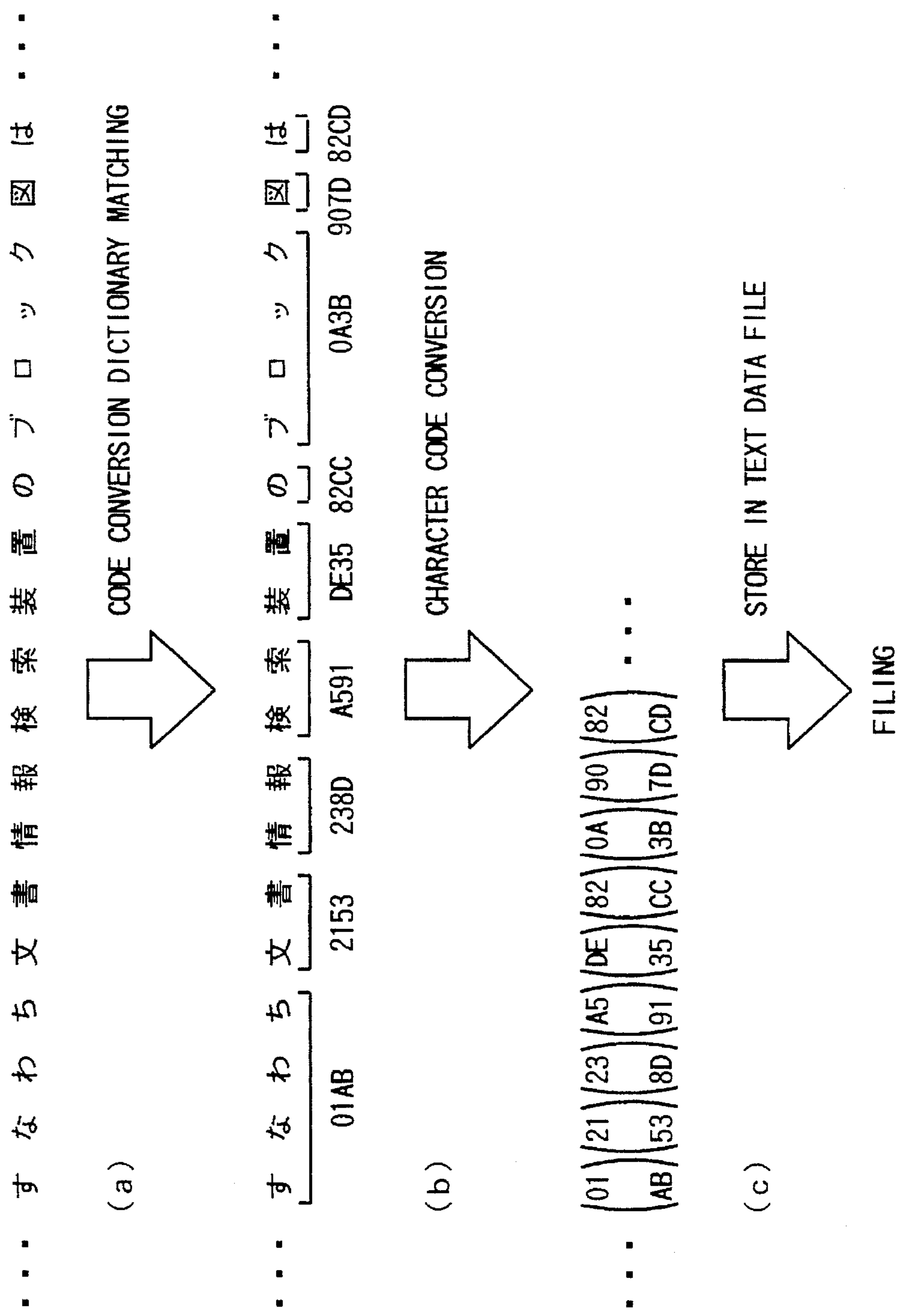
FIG. 11 is an example of text compression.

FIG. 11 shows an example of text compression.

FIG. 11(*a*) shows a part of an original document text. Here, the text part "すなわち文書情報検索装置のブロック図は" is taken as an example. Hitherto, one code has been assigned to one character of an original document text. For example, in the shift JIS code generally used as text code, one 16-bit code is given to one character. In the conventional example, nineteen 16-bit codes are required. However, if semantic units of words are considered, the minimum units as semantics are words such as Chinese compound words and conjunctions (in the example, "すなわち", "文書", "情報", "検索", "装置", "ブロック", etc.). Then, the text data analysis section 1102 decomposes text data into words which are the minimum semantic units and the text data compression section 1103 assigns codes to them according to the code conversion dictionary 1104 for document text compression. In the example, 16-bit codes are assigned to the words in such a manner that (01AB) is assigned to "すなわち", (2153) to "文書", and (0A3B) to "ブロック", as shown in FIG. 11(*b*). The words (character code strings) of the original document, such as character code string of "ブロック", and the compressed character codes corresponding to them, such as "0A3B", are registered in pairs in the code conversion dictionary 1104. The words may be registered by using a general dictionary or through the input means 1108 by the user. However, code information of each character should also be supported after compressed text conversion. This applies to "の", "図", and "は" in the example given above. Thus, the text data shown in FIG. 11(*b*) is converted into the compressed text data shown in FIG. 11(*c*) by the text data compression section 1103 for filing in the text data file 1106.

At retrieval, retrieval keywords are entered and converted into compressed keywords like the text data described above, then the compressed keywords are collated with compressed text data for retrieval.

In the example, the text part is converted into a text of nine 16-bit codes as a result of compression, providing the compression effect of compression percentage 50% or higher. By using the compression technique in the example, the text capacity is reduced by about 50% and the read time from storage media such as a disk is halved, and further the number of times text data is matched with keywords at retrieval is halved by retrieving the compressed text data; as a result, the retrieval speed can be made twice as high as the former speed.

Figure 12:
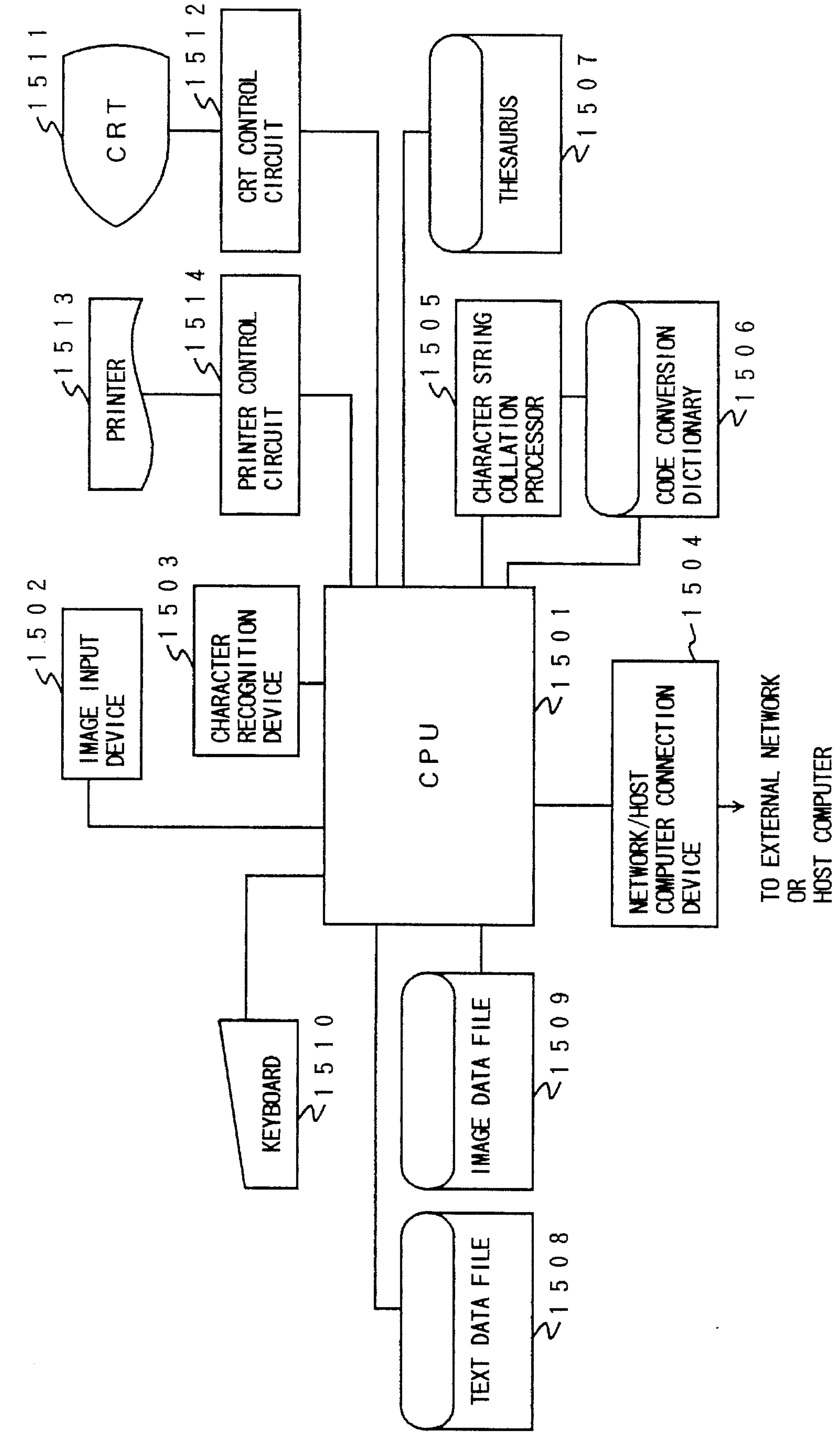
FIG. 12 is a configuration example of an information processing system to which the second embodiment of the invention is applied.

FIG. 12 shows a configuration example of an information processing system to which the second embodiment of the invention is applied.

In FIG. 12, numeral 1501 is a CPU (central processing unit) which processes text/image data, keywords and retrieval conditional expressions, document identifier information, etc. Numeral 1502 is an image input device for reading image data from hardcopies, etc. Numeral 1503 is a character recognition device which extracts and recognizes only character components from the read image data and converts the document information into text data. Numeral 1504 is a network/host computer connection device for reading text/image data via a network from various external systems or devices. Numeral 1505 is a character string collation processor which executes character string collation operation at high speed by using automaton and other character collation algorithms. Numeral 1506 is a code conversion dictionary in which the character code strings of an original document and the compressed codes after conversion are stored in pairs. Numeral 1507 is a thesaurus used for synonym retrieval for keywords at retrieval. Numeral 1508 is a text data file of a storage device which stores compressed text data after conversion. Numeral 1509 is an image data file which stores image data involved in text data. Numeral 1510 is input means such as a keyboard through which keywords are entered at retrieval or text data is directly entered. Numeral 1511 is output means such as a CRT for displaying the retrieval results. Numeral 1512 is a CRT control circuit which controls the CRT 1511. Numeral 1513 is output means such as a printer for printing out the retrieval results on paper. Numeral 1514 is a printer control circuit which controls the printer 1513. The CRT 1511 and the printer 1513 are output devices which can output the retrieval results.

In FIG. 12, first, when text data is registered, it is input to the CPU 1501 via the network/host computer connection device 1504; text data recognized and converted by the character recognition device 1503 from image data entered through the image input device 1502 is input to the CPU 1501; or text data is directly input to the CPU 1501 through the keyboard 1510. The input text data is analyzed by the CPU 1501, then the character string collation processor 1505 makes a character string collation of the analyzed input text data with the words registered in the code conversion dictionary 1506, and the CPU 1501 uses the collation results for compression processing. The compressed text data is stored in the text data file 1508 and the image data input together with the text data is stored in the image data file 1509.

Next, when text data is retrieved, keywords and retrieval expressions are input to the CPU 1501 through the keyboard 1510, via the network/host computer connection device 1504 from a network or a host computer, or through the image input device 1502 and character recognition device 1503. The CPU 1501 analyzes the input keywords and retrieval expressions, and uses the thesaurus 1507 for synonym expansion for the keywords and further uses the code conversion dictionary 1506 and the collation result from the character string collation processor 1505 to convert the keywords into compressed codes. Next, the character string collation processor 1501 makes a character string collation of the compressed codes of the keywords with the compressed text data fetched from the text data file 1508. The CPU 1501 judges the character string collation result and displays the document suitable for the retrieval result on the CRT 1511 or the printer 1513 for the retrieving person.

If a high-speed or high-level function is not required for a character string collation in the system configuration shown in FIG. 12, the CPU 1501 executes the character string collation and the character string collation processor 1505 can be eliminated. If a high-speed or high-level function is not required for character recognition, the CPU 1501 executes character recognition and the character recognition device 1503 can also be eliminated. The text data file 1508 and the image data file 1509 are separate files in the system configuration shown in FIG. 12, but can also be united as a single file for storing text data and image data.

According to the embodiment, when document text information is registered, text codes are compressed and saved in the text data file, thus enormous text data can be reduced without omitting original text information.

When document text information is retrieved, compressed text data is read, thus the processing time required to read from the text storage means (disk) can be shortened as compared with the conventional full text search. As a result, the retrieval speed can be improved.

Further, storage of semantics of an original document is considered for the document compression technique and minimum semantic units are assumed to be words to which new compressed codes are assigned. Retrieval words are also converted into compressed codes in a similar manner, then the compressed codes are used for matching, thereby providing a high-speed and handy document text retrieval method without the need for expanding text data into originals at compressed text retrieval. The effect of the system is remarkable particularly when it is necessary to store and retrieve enormous document texts, for example, in full text search application.

The compression method using the code conversion dictionary in the first embodiment may also be used for compression in the second embodiment.

According to the invention, there is provided a document information compression system which can reduce the storage capacity of text data and provides efficient compressed codes.

According to the invention, there is provided an excellent document information retrieval system which can improve the text data retrieval speed.

Further, according to the invention, there is provided an information processing system which can reduce the storage capacity of text data and improve the text data retrieval speed.

What is claimed is:

1. A document information compression and retrieval system comprising:

an input section for inputting document information;

a text analysis section which separates the document information consisting of a large number of characters input at said input section into words consisting of one or more characters;

a code conversion dictionary in which pairs of said words and compressed codes corresponding to said words are stored;

a text compression section which makes reference to said code conversion dictionary for converting said words into the compressed codes corresponding thereto;

compressed text storage means for storing the compressed codes of words of said document information compressed by said text compression section as a compressed text;

retrieval information input means for entering key information used to retrieve document information registered in said compressed text storage means;

a text retrieval section which makes reference to said code conversion dictionary for converting said key information into compressed key data corresponding thereto, and retrieves compressed texts including a compressed code identical to said compressed key data stored in said compressed text storage means;

an expansion section which expands the compressed text retrieved by said text retrieval section into document information;

an output section for outputting the document information restored by said expansion section; and character string registration means for detecting words not registered in said code conversion dictionary from said words into which said document information is separated by said text analysis section, and assigning fixed-length compressed codes to said detected words not registered in said code conversion dictionary in sequence for registering the words in said code conversion dictionary;

wherein said text compression section makes reference to the code conversion dictionary in which words are registered by said character string registration means for converting said words into the compressed codes corresponding thereto;

wherein when a compressed code registration area of said code conversion dictionary is finite, said character string registration means assigns the compressed codes to said detecting words in sequence, and terminates assignment of the compressed codes upon detection of said compressed code registration area becoming full; and wherein said text compression section, after the termination of assignment of the compressed codes, converts the words already registered in said code conversion dictionary into their corresponding compressed codes, and stores words not registered in said code conversion dictionary in said compressed text storage means without conversion into compressed codes.

2. A document information compression and retrieval system comprising:

an input section for inputting document information;

a text analysis section which separates the document information consisting of a large number of characters input at said input section into words consisting of one or more characters;

a code conversion dictionary in which pairs of said words and compressed codes corresponding to said words are stored;

a text compression section which makes reference to said code conversion dictionary for converting said words into the compressed codes corresponding thereto;

compressed text storage means for storing the compressed codes of words of said document information compressed by said text compression section as a compressed text;

retrieval information input means for entering key information used to retrieve document information registered in said compressed text storage means;

a text retrieval section which makes reference to said code conversion dictionary for converting said key information into compressed key data corresponding thereto, and retrieves compressed texts including a compressed code identical to said compressed key data stored in said compressed text storage means;

an expansion section which expands the compressed text retrieved by said text retrieval section into document information;

an output section for outputting the document information restored by said expansion section; and character string registration means for detecting words not registered in said code conversion dictionary from said words into which said document information is separated by said text analysis section, and assigning fixed-length compressed codes to said detected words not registered in said code conversion dictionary in sequence for registering the words in said code conversion dictionary;

wherein said text compression section makes reference to the code conversion dictionary in which words are registered by said character string registration means for converting said words into the compressed codes corresponding thereto;

wherein when a compressed code registration area of said code conversion dictionary is finite, said character string registration means assigns the compressed codes to said detecting words in sequence, and upon detection of said compressed code registration area becoming full, assigns identification information for identifying said code conversion dictionary, stores contents of said code conversion dictionary and said identification information to identify said dictionary, stores said identification information to identify said dictionary together with the compressed texts in said compressed text storage means, and creates a new code conversion dictionary for registering other words; and wherein when said document information is output, said expansion section uses the same code conversion dictionary that is used for compressing texts for expanding the compressed text.

3. A document information compression and retrieval system as claimed in claim 2, wherein the contents of said code conversion dictionary and said identification information to identify said dictionary are stored together with the compressed texts in said compressed text storage means.

4. A document information compression and retrieval system comprising:

an input section for inputting document information;

a text analysis section which separates the document information consisting of a large number of characters input at said input section into words consisting of one or more characters;

a code conversion dictionary in which pairs of said words and compressed codes corresponding to said words are stored;

a text compression section which makes reference to said code conversion dictionary for converting said words into the compressed codes corresponding thereto;

compressed text storage means for storing the compressed codes of words of said document information compressed by said text compression section as a compressed text;

retrieval information input means for entering key information used to retrieve document information registered in said compressed text storage means;

a text retrieval section which makes reference to said code conversion dictionary for converting said key information into compressed key data corresponding thereto, and retrieves compressed texts including a compressed code identical to said compressed key data stored in said compressed text storage means;

an expansion section which expands the compressed text retrieved by said text retrieval section into document information;

an output section for outputting the document information restored by said expansion section; and character string registration means for detecting words not registered in said code conversion dictionary from said words into which said document information is separated by said text analysis section, and assigning fixed-length compressed codes to said detected words not registered in said code conversion dictionary in sequence for registering the words in said code conversion dictionary;

wherein said text compression section makes reference to the code conversion dictionary in which words are registered by said character string registration means for converting said words into the compressed codes corresponding thereto;

wherein said document information compression and retrieval system further comprises a compressed word determination section including:

means for counting the number of occurrences of each of words of the document information input at said input section;

a word occurrence registration dictionary in which occurrence count information counted by said counting means is recorded;

means for calculating the compression effect for each word by using said occurrence count information and the character length of the word; and means for determining words to provide an optimum compression effect for all words of the document information from said word compression effect;

wherein when a compressed code registration area of said code conversion dictionary is finite, said character string registration means assigns the compressed codes to said detecting words in sequence, and detects when said compressed code registration area becomes full; and wherein upon detection of said compressed code registration area becoming full by said character string registration means, said determining means replaces words having a low compression effect with words providing an optimum compression effect for assignment of compressed codes in response to said compression effect calculated by said means for calculating the compression effect, and said character string registration means reads said compressed texts in said compressed text storage means, expands the compressed codes of said words having the low compression effect for storage in said compressed text storage means, and registers said words providing the optimum compression effect determined by said determining means in said code conversion dictionary.

5. A document information compression and retrieval system as claimed in claim 4, wherein said compressed word determination section assigns compressed codes to words providing a compression effect of a predetermined threshold of compression effect from compression effects of words of document information.

6. A document information compression and retrieval system comprising:

an input section for inputting document information;

a text analysis section which separates the document information consisting of a large number of characters input at said input section into words consisting of one or more characters;

a code conversion dictionary in which pairs of said words and compressed codes corresponding to said words are stored;

a text compression section which makes reference to said code conversion dictionary for converting said words into the compressed codes corresponding thereto;

compressed text storage means for storing the compressed codes of words of said document information compressed by said text compression section as a compressed text;

retrieval information input means for entering key information used to retrieve document information registered in said compressed text storage means;

a text retrieval section which makes reference to said code conversion dictionary for converting said key information into compressed key data corresponding thereto, and retrieves compressed texts including a compressed code identical to said compressed key data stored in said compressed text storage means;

an expansion section which expands the compressed text retrieved by said text retrieval section into document information;

an output section for outputting the document information restored by said expansion section; and character string registration means for detecting words not registered in said code conversion dictionary from said words into which said document information is separated by said text analysis section and, assigning fixed-length compressed codes to said detected words not registered in said code conversion dictionary in sequence for registering the words in said code conversion dictionary;

wherein said text compression section makes reference to the code conversion dictionary in which words are registered by said character string registration means for converting said words into the compressed codes corresponding thereto;

wherein said document information compression and retrieval system further comprises a character string table in which specific words are prestored; and wherein said character string registration means detects characters of said document information being katakana or alphanumeric, and upon detection, determines whether or not words not registered in said code conversion dictionary match the words stored in said character string table, and registers matching words in said code conversion dictionary.

7. A document information compression and retrieval system comprising:

an input section for inputting document information;

a text analysis section which separates the document information consisting of a large number of characters input at said input section into words consisting of one or more characters;

a code conversion dictionary in which pairs of said words and compressed codes corresponding to said words are stored;

a text compression section which makes reference to said code conversion dictionary for converting said words into the compressed codes corresponding thereto;

compressed text storage means for storing the compressed codes of words of said document information compressed by said text compression section as a compressed text;

retrieval information input means for entering key information used to retrieve document information registered in said compressed text storage means;

a text retrieval section which makes reference to said code conversion dictionary for converting said key information into compressed key data corresponding thereto, and retrieves compressed texts including a compressed code identical to said compressed key data stored in said compressed text storage means;

an expansion section which expands the compressed text retrieved by said text retrieval section into document information;

an output section for outputting the document information restored by said expansion section; and character string registration means for detecting words not registered in said code conversion dictionary from said words into which said document information is separated by said text analysis section and, assigning fixed-length compressed codes to said detected words not registered in said code conversion dictionary in sequence for registering the words in said code conversion dictionary;

wherein said text compression section makes reference to the code conversion dictionary in which words are registered by said character string registration means for converting said words into the compressed codes corresponding thereto;

wherein said document information compression and retrieval system further comprises a text analysis dictionary in which words for separating input document information into words are prestored;

wherein said text analysis section performs character string matching with said text analysis dictionary as a text analysis technique of separating said document information into words; and wherein said text analysis section adopts the longest word registered in said text analysis dictionary for separation when multiple match, in which more than one word separation way is defined for said document information, occurs in the character string matching with said text analysis dictionary.

8. A document information compression and retrieval system comprising:

an input section for inputting document information;

a text compression section which converts the document information input at said input section into a compressed text for compression;

text storage means for storing the compressed text into which the document information is converted by said text compression section;

retrieval information input means for entering key information and a retrieval condition used to retrieve document information registered in said text storage means;

retrieval expression conversion means for converting the key information entered through said retrieval information input means into compressed key data and by generating a retrieval condition expression from said retrieval condition;

character string collation means for collating said compressed key data with said compressed text stored in said text storage means and for outputting a collation result;

retrieval condition determination means being responsive to said collation result output from said character string collation means for determining a compressed text of document information matching said retrieval condition expression given from said retrieval expression conversion means;

an expansion section which expands the compressed text of document information matching said retrieval condition expression determined by said retrieval condition determination means into original document information; and output means for outputting the original document information expanded by said expansion section;

wherein said expansion section expands the compressed text to be collated when said character string collation means collates said compressed key data with said compressed text; and wherein said character string collation means collates said key information with restored document information.

9. A document information compression and retrieval system comprising:

an input section for inputting document information;

a text compression section which converts the document information input at said input section into a compressed text for compression;

text storage means for storing the compressed text into which the document information is converted by said text compression section;

retrieval information input means for entering key information and a retrieval condition used to retrieve document information registered in said text storage means;

retrieval expression conversion means for converting the key information entered through said retrieval information input means into compressed key data and by generating a retrieval condition expression from said retrieval condition;

character string collation means for collating said compressed key data with said compressed text stored in said text storage means and for outputting a collation result;

retrieval condition determination means being responsive to said collation result output from said character string collation means for determining a compressed text of document information matching said retrieval condition expression given from said retrieval expression conversion means;

an expansion section which expands the compressed text of document information matching said retrieval condition expression determined by said retrieval condition determination means into original document information;

output means for outputting the original document information expanded by said expansion section; and a text analysis section which separates said document information input at said input section into words that can be assumed to be semantic units;

wherein said text compression section assigns a compressed code to each of said words provided by said text analysis section for conversion to a compressed text; and wherein said text analysis section recognizes a portion of words where a shift read which two or more ways of separation for said document information can be available occurs, and adds predetermined information to said portion.

10. A document information compression and retrieval system as claimed in claim 9, wherein said text analysis section extracts a plurality of word groups corresponding to a plurality of separation ways when a shift read of words occurs;

wherein said text compression section assigns compressed codes to the words in said plurality of extracted word groups for conversion to a compressed text; and wherein said character string collation means collates all of said words in said words with the compressed key data at retrieval.

11. A document information compression and retrieval system comprising:

an input section for inputting document information;

a text compression section which converts the document information input at said input section into a compressed text for compression;

text storage means for storing the compressed text into which the document information is converted by said text compression section;

retrieval information input means for entering key information and a retrieval condition used to retrieve document information registered in said text storage means;

retrieval expression conversion means for converting the key information entered through said retrieval information input means into compressed key data and by generating a retrieval condition expression from said retrieval condition;

character string collation means for collating said compressed key data with said compressed text stored in said text storage means and for outputting a collation result;

retrieval condition determination means being responsive to said collation result output from said character string collation means for determining a compressed text of document information matching said retrieval condition expression given from said retrieval expression conversion means;

an expansion section which expands the compressed text of document information matching said retrieval condition expression determined by said retrieval condition determination means into original document information;

output means for outputting the original document information expanded by said expansion section; and a text analysis section which separates said document information input at said input section into words that can be assumed to be semantic units;

wherein said text compression section assigns a compressed code to each of said words provided by said text analysis section for conversion to a compressed text;

wherein said text analysis section recognizes a portion where a shift read of words into which two or more ways of separation for said document information can be available occurs;

wherein said text compression section does not convert said portion into a compressed text;

wherein said text storage means stores said portion as document information intact; and wherein said character string collation means also collates key information with said document information at retrieval.

12. A document information compression and retrieval system comprising:

an input section for inputting document information;

a text compression section which converts the document information input at said input section into a compressed text for compression;

text storage means for storing the compressed text into which the document information is converted by said text compression section;

retrieval information input means for entering key information and a retrieval condition used to retrieve document information registered in said text storage means;

retrieval expression conversion means for converting the key information entered through said retrieval information input means into compressed key data and by generating a retrieval condition expression from said retrieval condition;

character string collation means for collating said compressed key data with said compressed text stored in said text storage means and for outputting a collation result;

retrieval condition determination means being responsive to said collation result output from said character string collation means for determining a compressed text of document information matching said retrieval condition expression given from said retrieval expression conversion means;

an expansion section which expands the compressed text of document information matching said retrieval condition expression determined by said retrieval condition determination means into original document information;

output means for outputting the original document information expanded by said expansion section; and a text analysis section which separates said document information input at said input section into words that can be assumed to be semantic units;

wherein said text compression section assigns a compressed code to each of said words provided by said text analysis section for conversion to a compressed text;

wherein said retrieval expression conversion means recognizes a portion where a shift read of words into which two or more ways of separation for said entered key information can be available occurs, extracts a plurality of word groups corresponding to a plurality of separation ways when a shift read of words occurs, assigns compressed codes to the words in said plurality of extracted word groups for conversion to compressed key data, and generates a retrieval condition expression from said retrieval condition; and wherein said character string collation means collates all of said compressed key data with compressed text data at retrieval.

13. A document information compression and retrieval system comprising:

an input section for inputting document information;

a text compression section which converts the document information input at said input section into a compressed text for compression;

text storage means for storing the compressed text into which the document information is converted by said text compression section;

retrieval information input means for entering key information and a retrieval condition used to retrieve document information registered in said text storage means;

retrieval expression conversion means for converting the key information entered through said retrieval information input means into compressed key data and by generating a retrieval condition expression from said retrieval condition;

character string collation means for collating said compressed key data with said compressed text stored in said text storage means and for outputting a collation result;

retrieval condition determination means being responsive to said collation result output from said character string collation means for determining a compressed text of document information matching said retrieval condition expression given from said retrieval expression conversion means;

an expansion section which expands the compressed text of document information matching said retrieval condition expression determined by said retrieval condition determination means into original document information;

output means for outputting the original document information expanded by said expansion section; and a text analysis section which separates said document information input at said input section into words that can be assumed to be semantic units;

wherein said text compression section assigns a compressed code to each of said words provided by said text analysis section for conversion to a compressed text;

wherein said document information compression and retrieval system further comprises a code conversion dictionary in which said words and compressed codes are stored in pairs;

wherein said text compression section makes reference to said code conversion dictionary for conversion to a compressed text;

wherein said document information compression and retrieval system further comprises a plurality of types of said code conversion dictionary;

wherein said retrieval information input means accepts a selection specification of a dictionary to be used in response to the type of document;

wherein said text compression section makes reference to the specified code conversion dictionary for conversion to a compressed text, and adds identification information to identify the used code conversion dictionary to said compressed text; and wherein said expansion section makes reference to said code conversion dictionary identification information, and uses the code conversion dictionary corresponding thereto for expanding the compressed text into original document information.

14. A document information compression and retrieval system as claimed in claim 13, wherein said retrieval expression conversion means makes reference to said specified code conversion dictionary for converting the entered key information into compressed key data.

15. A document information compression and retrieval system comprising:

an input section for inputting document information;

a text compression section which converts the document information input at said input section into a compressed text for compression;

text storage means for storing the compressed text into which the document information is converted by said text compression section;

retrieval information input means for entering key information and a retrieval condition used to retrieve document information registered in said text storage means;

retrieval expression conversion means for converting the key information entered through said retrieval information input means into compressed key data and by generating a retrieval condition expression from said retrieval condition;

character string collation means for collating said compressed key data with said compressed text stored in said text storage means and for outputting a collation result;

retrieval condition determination means being responsive to said collation result output from said character string collation means for determining a compressed text of document information matching said retrieval condition expression given from said retrieval expression conversion means;

an expansion section which expands the compressed text of document information matching said retrieval condition expression determined by said retrieval condition determination means into original document information; and output means for outputting the original document information expanded by said expansion section;

wherein said text storage means stores identifier information assigned to a compressed text together with said compressed text; and wherein said output means outputs said document identifier information instead of the expanded document information restored by said expansion section.

16. A document information compression and retrieval system comprising:

an input section for inputting document information;

a text compression section which converts the document information input at said input section into a compressed text for compression;

text storage means for storing the compressed text into which the document information is converted by said text compression section;

retrieval information input means for entering key information and a retrieval condition used to retrieve document information registered in said text storage means;

retrieval expression conversion means for converting the key information entered through said retrieval information input means into compressed key data and by generating a retrieval condition expression from said retrieval condition;

character string collation means for collating said compressed key data with said compressed text stored in said text storage means and for outputting a collation result;

retrieval condition determination means being responsive to said collation result output from said character string collation means for determining a compressed text of document information matching said retrieval condition expression given from said retrieval expression conversion means;

an expansion section which expands the compressed text of document information matching said retrieval condition expression determined by said retrieval condition determination means into original document information;

output means for outputting the original document information expanded by said expansion section; and image data storage means, when document information is registered, for registering image data related to said document information;

wherein said output means outputs the image data related to said document information instead of the expanded document information restored by said expansion section.

* * * * *